(12) United States Patent
Weiss et al.

(10) Patent No.: US 10,717,069 B2
(45) Date of Patent: Jul. 21, 2020

(54) FUEL UPGRADING BY REFORMING AND DEHYDROCRACKING

(71) Applicant: ExxonMobil Research and Engineering Company, Annandale, NJ (US)

(72) Inventors: Brian M. Weiss, Bridgewater, NJ (US); Gerardo J. Majano, Raritan, NJ (US); Tilman W. Beutel, Neshanic Station, NJ (US); Karl G. Strohmaier, Port Murray, NJ (US); John F. Brody, Bound Brook, NJ (US); Samia Ilias, Bridgewater, NJ (US); Scott J. Weigel, Allentown, PA (US); Shamel Merchant, Bridgewater, NJ (US); Eugine Choi, Marlton, NJ (US); Robert J. Colby, Annandale, NJ (US); Walter Weissman, Basking Ridge, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 162 days.

(21) Appl. No.: 15/831,594

(22) Filed: Dec. 5, 2017

(65) Prior Publication Data
US 2018/0169623 A1 Jun. 21, 2018

Related U.S. Application Data

(60) Provisional application No. 62/436,595, filed on Dec. 20, 2016.

(51) Int. Cl.
| | | |
|---|---|---|
| *B01J 23/46* | (2006.01) | |
| *F02M 26/35* | (2016.01) | |
| *C10L 3/08* | (2006.01) | |
| *C01B 3/40* | (2006.01) | |
| *B01J 23/08* | (2006.01) | |
| *B01J 23/06* | (2006.01) | |
| *B01J 23/60* | (2006.01) | |
| *B01J 29/70* | (2006.01) | |

(Continued)

(52) U.S. Cl.
CPC ............ *B01J 23/464* (2013.01); *B01J 23/06* (2013.01); *B01J 23/08* (2013.01); *B01J 23/10* (2013.01); *B01J 23/60* (2013.01); *B01J 29/44* (2013.01); *B01J 29/46* (2013.01); *B01J 29/48* (2013.01); *B01J 29/70* (2013.01); *B01J 29/7015* (2013.01); *B01J 29/74* (2013.01); *B01J 29/743* (2013.01); *B01J 29/76* (2013.01); *B01J 29/763* (2013.01); *B01J 29/78* (2013.01); *B01J 29/783* (2013.01); *B01J 29/80* (2013.01); *B01J 29/85* (2013.01); *B01J 35/0006* (2013.01); *B01J 37/04* (2013.01); *B01J 37/28* (2013.01); *C01B 3/40* (2013.01); *C10G 2/333* (2013.01); *C10G 2/334* (2013.01); *C10G 35/09* (2013.01); *C10G 35/095* (2013.01); *C10G 47/04* (2013.01); *C10G 47/14* (2013.01); *C10G 47/18* (2013.01); *C10G 47/20* (2013.01); *C10G 63/08* (2013.01); *C10L 3/08* (2013.01); *F02M 26/35* (2016.02); *B01D 53/92* (2013.01); *B01D 2256/24* (2013.01); *B01J 23/002* (2013.01); *B01J 23/62* (2013.01); *B01J 23/63* (2013.01); *B01J 37/0201* (2013.01); *B01J 37/03* (2013.01); *B01J 37/088* (2013.01); *B01J 2229/186* (2013.01); *B01J 2229/20* (2013.01); *B01J 2229/24* (2013.01); *B01J 2523/00* (2013.01); *C01B 2203/0227* (2013.01); *C01B 2203/0233* (2013.01); *C01B 2203/0277* (2013.01); *C01B 2203/062* (2013.01); *C01B 2203/1064* (2013.01); *C01B 2203/1076* (2013.01); *C01B 2203/1082* (2013.01); *C01B 2203/1247* (2013.01); *C01B 2203/1252* (2013.01); *C01B 2203/84* (2013.01); *C10G 2300/104* (2013.01); *C10G 2300/305* (2013.01); *C10G 2400/02* (2013.01)

(58) Field of Classification Search
CPC combination set(s) only.
See application file for complete search history.

(56) References Cited

U.S. PATENT DOCUMENTS

| | | | |
|---|---|---|---|
| 3,918,412 A | | 11/1975 | Lindstrom |
| 4,861,932 A | * | 8/1989 | Chen ...................... C07C 5/417 585/412 |

(Continued)

FOREIGN PATENT DOCUMENTS

EP        1972776 A2      3/2008

OTHER PUBLICATIONS

Peucheret et al., "Exhaust Gas Reforming Using Precious Metal Catalysts", Applied Catalysis B: Environmental, Jun. 6, 2006, pp. 201-206, vol. 65, iss. 3-4, Science Direct, Elsevier.

(Continued)

*Primary Examiner* — Kaity V Chandler
(74) *Attorney, Agent, or Firm* — Robert A. Migliorini

(57) ABSTRACT

Zn-promoted and/or Ga-promoted cracking catalysts, such as cracking catalysts comprising an MSE framework zeolite or an MFI framework zeolite can provide unexpectedly superior conversion of branched paraffins when used as part of a catalyst during reforming of a hydrocarbon fuel stream. The conversion and reforming of the hydrocarbon fuel stream can occur, for example, in an internal combustion engine. The conversion and reforming can allow for formation of higher octane compounds from the branched paraffins.

20 Claims, 14 Drawing Sheets

(51) Int. Cl.

| | | |
|---|---|---|
| *B01J 29/85* | (2006.01) | |
| *B01J 23/10* | (2006.01) | |
| *B01J 29/74* | (2006.01) | |
| *B01J 35/00* | (2006.01) | |
| *C10G 63/08* | (2006.01) | |
| *B01J 29/78* | (2006.01) | |
| *C10G 47/20* | (2006.01) | |
| *B01J 37/28* | (2006.01) | |
| *B01J 29/46* | (2006.01) | |
| *B01J 37/04* | (2006.01) | |
| *B01J 29/48* | (2006.01) | |
| *C10G 47/14* | (2006.01) | |
| *C10G 2/00* | (2006.01) | |
| *B01J 29/76* | (2006.01) | |
| *B01J 29/44* | (2006.01) | |
| *C10G 47/04* | (2006.01) | |
| *C10G 47/18* | (2006.01) | |
| *B01J 29/80* | (2006.01) | |
| *C10G 35/09* | (2006.01) | |
| *C10G 35/095* | (2006.01) | |
| *B01J 23/00* | (2006.01) | |
| *B01J 37/08* | (2006.01) | |
| *B01J 23/63* | (2006.01) | |
| *B01J 37/03* | (2006.01) | |
| *B01J 37/02* | (2006.01) | |
| *B01J 23/62* | (2006.01) | |
| *B01D 53/92* | (2006.01) | |

(56) References Cited

U.S. PATENT DOCUMENTS

| | | |
|---|---|---|
| 4,884,531 A | 12/1989 | Degnan, Jr. et al. |
| 5,135,898 A | 8/1992 | Le Van Mao et al. |
| 5,260,043 A * | 11/1993 | Li .................. B01D 53/8625 |
| | | 423/239.2 |
| 5,733,677 A * | 3/1998 | Golovin ............ H01M 12/065 |
| | | 429/407 |
| 5,763,731 A * | 6/1998 | McVicker ................ C07C 5/31 |
| | | 585/737 |
| 6,047,544 A * | 4/2000 | Yamamoto ........... B01D 53/945 |
| | | 422/171 |
| 7,824,656 B2 * | 11/2010 | Idem .................... B01J 21/066 |
| | | 423/651 |
| 9,616,420 B2 * | 4/2017 | Chandler ................ B01J 29/88 |
| 9,617,490 B2 | 4/2017 | Weiss et al. |
| 2005/0143610 A1 | 6/2005 | Mitchell et al. |
| 2007/0260098 A1 | 11/2007 | Iaccino et al. |
| 2014/0140921 A1 | 5/2014 | Burton et al. |
| 2015/0167587 A1 | 6/2015 | Weiss et al. |
| 2015/0167588 A1 | 6/2015 | Beutel et al. |
| 2015/0174561 A1 | 6/2015 | McCarthy et al. |
| 2017/0087540 A1 | 3/2017 | Buchanan et al. |

OTHER PUBLICATIONS

Rane et al., "Characterization and Reactivity of Ga+ and GaO+ cations in zeolite ZSM-5", Journal of Catalysis, Apr. 25, 2006, pp. 478-485, vol. 239, iss. 2, Science Direct, Elsevier.

Biscardi et al., "Structure and Density of Active Zn Species in Zn/H-ZSM-5 Propane Aromatization Catalysts" Journal of Catalysis, Oct. 1, 1998, pp. 192-202, vol. 179, iss. 1, Science Direct, Elsevier.

The International Search Report and Written Opinion of PCT/US2017/064639 dated Mar. 12, 2018.

Choudhary et al., "Low-Temperature Nonoxidative Activation of Methane over H-Galloaluminosilicate (MFI) Zeolite", Science, 1997, 275, pp. 1286-1288.

Volkov et al., "Catalytic Properties of RhSe2/Ga/H-ZSM-5 System in the Reaction of Glycerol Dehydration in the Gas Phase", Russian J. Appl. Chem., 2016, 89, pp. 233-237.

* cited by examiner

FUEL UPGRADING BY REFORMING AND DEHYDROCRACKING

CROSS-REFERENCE TO RELATED APPLICATIONS

This application claims the benefit of U.S. Provisional Application No. 62/436,595 filed on Dec. 20, 2016, the entire contents of which are incorporated herein by reference.

FIELD

Embodiments of the invention relate to catalytic reforming of mixtures of hydrocarbon-containing fuels and internal combustion engine exhaust gas. In particular, embodiments of the invention relate to catalytic reforming of such engine exhaust gas mixtures that produce an amount of methane sufficient to sustain the formation of CO (and/or $CO_2$) and $H_2$ in the reformer.

BACKGROUND

Conventional internal combustion engine designs can typically include a single fuel for combustion within the engine cylinders. This can require careful selection of an appropriate fuel, so that the fuel has appropriate combustion properties, such as a suitable Research Octane Number or a suitable flame speed. This can limit the selection of fuels, as some compositions that may be suitable from an energy content standpoint can lack appropriate combustion properties.

In addition to naphtha boiling range (gasoline) and distillate boiling range (kerosene or diesel) fuels, some alternative types of fuels are available for use in internal combustion engines. For example, an engine can be configured for use with natural gas as a fuel.

U.S. Patent Application Publication 2015/0167587 describes catalyst compositions suitable for use in the exhaust gas recycle stream of an internal combustion engine. The catalyst compositions can include a reforming catalyst, such as a catalyst including a CHA framework zeolite, a metal oxide, and Rh supported on the zeolite and/or the metal oxide. The catalyst compositions can further include a cracking catalyst such as ZSM-5, phosphorus-modified ZSM-5, and/or MCM-68.

SUMMARY

In various aspects, a catalytic composition is provided. The catalytic composition can include at least 5 wt % relative to a weight of the catalytic composition of a first catalyst comprising a support material and about 0.25 wt % to about 10 wt % Rh relative to the weight of the first catalyst. The catalytic composition can further include at least 10 wt % relative to a weight of the catalytic composition of a second catalyst comprising a zeolite having a largest ring size of an 8-member ring and about 0.25 wt % to about 10 wt % Rh relative to the weight of the second catalyst. The catalytic composition can further include at least 20 wt % relative to a weight of the catalytic composition of a third catalyst comprising a MSE framework type zeolite, an MFI framework type zeolite, or a combination thereof. The third catalyst can further include about 0.2 wt % to about 3.0 wt % of Zn, Ga, or a combination thereof relative to a weight of the cracking catalyst. Optionally, the catalytic composition can correspond to a physical mixture of the first catalyst, the second catalyst, and the third catalyst. Optionally, the catalytic composition can further comprise one or more additional zeolites, the one or more additional zeolites having a largest ring size of a 10-member ring or a 12-member ring.

In some aspects, the MSE framework type zeolite can comprise MCM-68 and/or the MFI framework type zeolite can comprise ZSM-5. In some aspects, the second catalyst can comprise a CHA framework type zeolite. Additionally or alternately, the third catalyst can comprise about 0.2 wt % to about 2.5 wt % Ga, or about 0.7 wt % to about 2.5 wt %, or about 0.7 wt % to about 2.0 wt %; or the third catalyst can comprise about 0.2 wt % to about 2.5 wt % Zn, or about 0.2 wt % to about 2.0 wt %, or about 0.2 wt % to about 1.5 wt %; or the third catalyst can comprise about 0.2 wt % to about 2.5 wt % combined of Zn and Ga, or about 0.2 wt % to about 2.0 wt %, or about 0.2 wt % to about 1.5 wt %. Additionally or alternately, the third catalyst can further comprise about 0.1 wt % to about 10 wt % P, or about 0.1 wt % to about 5.0 wt %, or about 0.1 wt % to about 3.0 wt %.

In some aspects, the first catalyst, the second catalyst, and/or the third catalyst can further comprise about 0.25 wt % to about 10 wt % of an additional metal selected from the group consisting of Co, Ru, Pt, Pd, Ni, Ir, Zn, Re and mixtures thereof. For the first catalyst and/or the second catalyst, a total weight of Rh and the additional metal can be about 20 wt % or less relative to the weight of the first catalyst and/or the second catalyst. For the third catalyst, a total weight of the Zn, Ga, or a combination thereof and the additional metal being about 10 wt % or less relative to the weight of the third catalyst.

In some aspects, the support material can comprise a metal oxide composition selected from aluminum oxides, silicon oxides, rare-earth metal oxides, Group IV metal oxides, and mixtures thereof. Optionally, the metal oxide composition can comprise a mixture of an aluminum-containing oxide and a cerium-containing oxide. Additionally or alternately, the support material comprises a zeolite having a largest ring size of a 10-member ring or a 12-member ring.

In some aspects, the catalytic composition can be used for conversion of a hydrocarbon-containing fuel. For example, the catalytic composition can be used in a reformer for use in an exhaust gas recycle portion of an internal combustion engine powertrain, said reformer. In such aspects, the catalytic composition in the reformer can be configured to convert a mixture comprising an internal combustion engine exhaust gas and a first hydrocarbon-containing fuel to a gaseous mixture comprising $H_2$, CO, $CO_2$, $H_2O$, $N_2$, and greater than about 1.0 mol % $CH_4$ based on the total moles of gas in the gaseous mixture.

As another example, the catalytic composition can be used in a method of increasing the octane rating of an internal combustion engine exhaust gas stream. Such a method can include providing an exhaust gas-containing mixture to an exhaust gas recycle reformer, the exhaust gas-containing mixture comprising engine exhaust gas and a first hydrocarbon-containing fuel, said engine exhaust gas having an initial octane rating, and converting under reforming conditions at least a portion of the exhaust gas-containing mixture in the presence of the catalytic composition to form a reformed gaseous mixture, the reformed gas mixture comprising $H_2$, CO, $CO_2$, $H_2O$, $N_2$, and greater than about 1.0 mol % $CH_4$ based on the total moles of gas in the reformed gaseous mixture.

Optionally, in aspects where the catalytic composition is used for conversion of a hydrocarbon-containing fuel, conversion within a reformer can supply heat sufficient to maintain the reformer at an average reformer temperature above about 450° C. Optionally, a reformed gaseous mixture produced by use of the catalytic composition can correspond to a mixture having one or more desirable properties, such as a reformed gas mixture comprising an octane rating (RON) from about 100 to about 125, and/or a reformed gaseous mixture comprising from 1.0 mol % to 20 mol % $CH_4$, and/or a reformed gaseous mixture comprising a $CH_4$:$H_2$ ratio (mol/mol) of at least about 0.05 to 1.0.

Optionally, in aspects where the catalytic composition is used for conversion of a hydrocarbon-containing fuel, a selectivity for methane formation during conversion under reforming conditions can be at least 5.0 mol % relative to a total moles of product carbon atoms from converted feed hydrocarbons from the conversion under reforming conditions, or at least 10 mol %, or at least 20 mol %.

DETAILED DESCRIPTION

Figure 1:
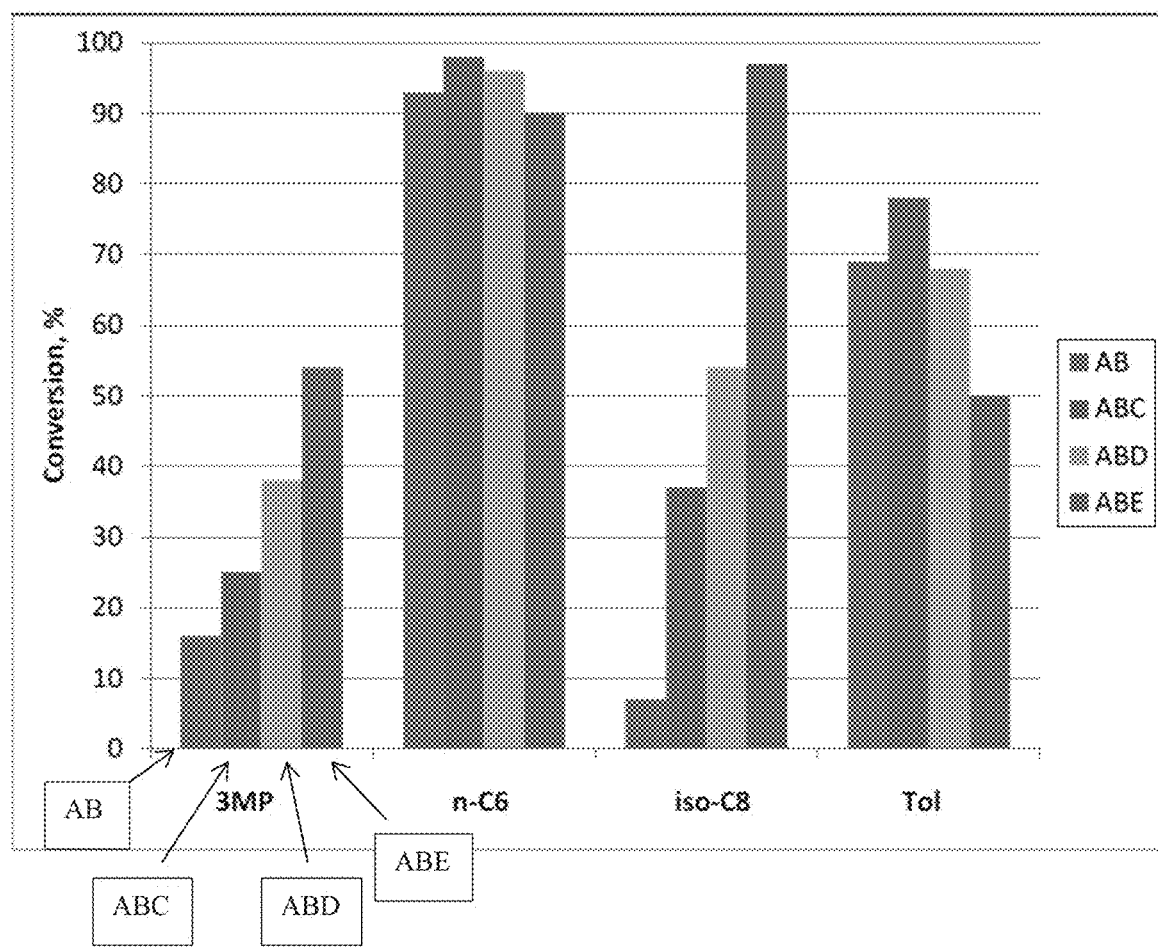
FIG. 1 shows a graph of conversion rates for conversion of a model fuel composition in the presence of various catalyst compositions.

As used herein the terms "substantially free of an oxygen-containing gas" or "does not substantially include providing an oxygen containing gas" mean that an oxygen-containing gas other than the exhaust gas of the internal combustion engine is not purposely provided to the catalytic reforming unit. Additionally or alternatively, these terms can mean that not more than about 0.5 mol % (e.g., not more than about 0.2 mol %, not more than about 0.1 mol %, not more than about 0.05 mol %, or not more than about 0.01 mol %) of the total amount of gas supplied to the reforming unit is an oxygen-containing gas other than the exhaust gas of the internal combustion engine.

Octane ratings described herein generally refer to the Research Octane Number (RON), unless otherwise specified. In this discussion and the claim below, Research Octane Number (RON) is determined according to ASTM D2699. As explained in ASTM D2699, RON is determined by running the fuel in a test engine with a variable compression ratio under controlled conditions, and comparing the results with those for mixtures of iso-octane and n-heptane.

In this discussion and the claims below, a zeolite is defined to refer to a crystalline material having a porous framework structure built from tetrahedra atoms connected by bridging oxygen atoms. Examples of known zeolite frameworks are given in the "Atlas of Zeolite Frameworks" published on behalf of the Structure Commission of the International Zeolite Association", 6$^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, and/or other transition metals that can substitute for silicon and/or aluminum in a zeolitic framework.

Overview

It has been discovered that Zn-promoted and/or Ga-promoted cracking catalysts, such as cracking catalysts comprising an MSE framework zeolite (such as MCM-68) or an MFI framework zeolite (such as ZSM-5) can provide unexpectedly superior conversion of branched paraffins when used as part of a catalyst (such as a catalyst system comprising a plurality of catalysts) during reforming of a hydrocarbon fuel stream. The conversion and reforming of the hydrocarbon fuel stream can occur, for example, in an internal combustion engine. The conversion and reforming can allow for formation of higher octane compounds from the branched paraffins.

The Zn-enhanced or Ga-enhanced cracking catalyst can be included as a portion of a catalyst composition that can effectively convert a mixture of naphtha boiling range hydrocarbons (such as by cracking, methanation, and reforming) in the presence of exhaust gas into synthesis gas (CO, $H_2$) and a relatively large amount of methane, $CH_4$. In particular, the catalytic composition can provide enhanced conversion of branched paraffin compounds under reforming conditions. For many types of conventional gasoline, isoparaffins can correspond to about 40 vol % to 50 vol % of the gasoline. Conventional catalyst compositions for conversion of hydrocarbons in a reforming environment can have a limited ability to convert such isoparaffins. Due to the high percentage of isoparaffins in a typical gasoline, the limitations on conversion of isoparaffins can result in only modest reforming of a feed, and therefore only limited improvement in feed properties. Thus, the improved activity for conversion of isoparaffins by a catalytic composition including a Zn-enhanced and/or Ga-enhanced cracking catalyst can provide a substantial advantage for conversion of a gasoline composition. Such an activity advantage based on a Zn-enhanced and/or a Ga-enhanced catalyst is unexpected, in part due to the conventional understanding of Zn and Ga as catalysts for promoting aromatization. Instead of promoting aromatization, for the catalysts described herein, Zn and Ga were observed to provide unexpected activity for conversion of isoparaffins (such as 3-methylpentane) to methane and synthesis gas.

In some aspects, the catalytic composition can also include a catalyst that can enhance the formation of methane. The catalytic composition can produce sufficient amounts of methane in the exothermic methanation reaction to sustain the reformer temperatures for the syngas producing endothermic reforming reaction, such that relatively little or no other heat may need to be added to the reformer to sustain the reforming reaction.

In some aspects, the invention can be further based in part on using thermal cracking and/or catalyzed cracking reactions to convert a portion of the hydrocarbon-containing fuel to higher octane compounds. This can reduce or minimize the amount of heat required to balance the endothermic nature of the reforming reaction. The catalytic composition can produce sufficient amounts of methane in the exothermic methanation reaction to sustain the reformer temperatures for the syngas producing endothermic reforming reaction, such that relatively little or no other heat may need to be added to the reformer to sustain the reforming reaction.

In some aspects, the catalytic composition can include a mixture of (up to) three types of catalysts. A first catalyst can correspond to a reforming catalyst. The first catalyst can include a reforming metal, such as Rh, on a low acidity support material suitable for use in an engine environment. Suitable support materials can correspond to, for example, one or more low acidity metal oxides. A second catalyst can correspond to a methanation catalyst. The methanation catalyst can include a 8-member ring zeolite (such as chabazite and/or another CHA framework zeolite) with a supported metal, such as Rh. Optionally, the methanation catalyst can include a binder and/or other metal oxide support material. The third catalyst can correspond to an MSE and/or MFI framework zeolite with Zn and/or Ga as a supported metal, which can provide cracking/dehydrocracking activity. The third catalyst can optionally include a binder and/or other metal oxide support material. The catalysts can be mixed or segregated within the reaction environment to form the catalyst composition according to design parameters, e.g., to efficiently distribute and/or transfer heat within the reformer. In aspects where the catalytic composition corresponds to a mixture of catalysts, the catalytic composition can correspond to a physical mixture of catalysts. Alternatively, the catalytic composition can correspond to catalyst particles/catalyst structures that include two or more of the catalysts described above. Optionally, the catalytic composition can further comprise one or more additional metals and/or one or more additional zeolites.

The catalytic composition can be capable of catalyzing hydrocarbon reforming and methane formation. The formation of $CH_4$ is typically exothermic, and the heat it produces may be used to supply heat and/or to sustain a reforming reaction to produce synthesis gas or "syngas" that includes hydrogen and carbon monoxide. Hydrocarbons and hydrocarbonaceous compounds (such as alcohols) can be reformed, such as by steam reforming, to produce syngas under appropriate conditions in the presence of a reforming catalyst. In an engine or power train environment, reforming can be used to convert hydrocarbon or hydrocarbonaceous compounds into CO and $H_2$. The CO and $H_2$ provide a somewhat higher octane rating and/or flame speed than some components in a typical naphtha boiling range fuel such as $C_{5+}$ isoparaffins. Additionally, if the reforming catalyst also has activity for forming methane from CO and $H_2$, the methane can serve as a still higher octane rating component in the reformed fuel stream.

Steam reforming is typically an endothermic process, so that additional heat is provided to the reforming process if it is desired to maintain the temperature of the reaction environment. Equation 1 shows the enthalpy of reaction for steam reforming of n-hexane, with the enthalpy expressed per mole of carbon in the fuel. Equation 2 similarly shows the enthalpy of reaction for conversion of toluene in a reforming environment.

$$C_6H_{14}+6H_2O=6CO+13H_2 \quad \Delta H(500°\ C.)=169\ kJ/mol\ C \tag{1}$$

$$C_7H_8+H_2O=CO+2H_2+C_6H_6 \quad \Delta H(500°\ C.)=25\ kJ/mol\ C \tag{2}$$

For reforming processes in an engine or power train environment, additional heat can be provided by combustion of fuel, but this decreases the overall efficiency of the engine. One option for reducing the amount of additional heat required can be to generate additional heat in the reaction zone, such as by methanation. The same catalysts that are effective for reforming can often also be effective for converting CO and $H_2$ to methane. The formation of methane from CO and $H_2$ is an exothermic process, as shown in Equation 3.

$$CO+3H_2=CH_4+H_2O \quad \Delta H(500°\ C.)=-212\ kJ/mol\ C \tag{3}$$

As shown in Equation 3, converting CO and $H_2$ in the reforming environment into $CH_4$ can provide a method for further reducing or minimizing the amount of additional heat that needs to be supplied to the reforming reaction zone. Both methane and syngas provide a higher octane value and/or flame speed than most of the typical components present in gasoline.

Another option for reducing the amount of additional heat required can be to convert a portion of a hydrocarbon fuel by cracking instead of reforming. Cracking can also be beneficial for assisting with conversion of isoparaffins. Isoparaffins typically have slow rates of conversion by reforming, but an initial dehydrogenation to form an olefin and/or cracking to form a smaller compound can provide pathways for faster conversion. Equations 4 and 5 show enthalpies of reaction for dehydrogenation of 3-methylpentane to 2-methyl-2-pentene (Equation 4) and cracking of 2-methyl-2-pentene to propene (Equation 5). Again, the enthalpy is expressed per mole of carbon in the n-heptane fuel.

$$C_6H_{14}=C_6H_{12}+H_2 \quad \Delta H(500°\ C.)=17.9\ kJ/mol\ C \tag{4}$$

$$C_6H_{12}=2C_3H_6 \quad \Delta H(500°\ C.)=17.6\ kJ/mol\ C \tag{5}$$

In the exemplary cracking reactions shown in Equations 4 and 5, methylpentane is converted into propene and hydrogen, which have substantially higher octane values and/or flame speed than methylpentane. More generally, various cracking reactions can occur for various types of isoparaffins that are dehydrogenated to olefins, resulting in formation of various cracked $C_{2+}$ olefins and/or other hydrocarbons. Based on the enthalpy for the combined reactions in Equations 4 and 5, this conversion requires less than 20% of the added heat required for reforming on a per carbon basis. However, formation of olefins can traditionally be viewed as less desirable, as it is believed that olefin formation can contribute to formation of coke on catalyst. In some aspects, an additional benefit of including a Zn-enhanced MSE framework catalyst as part of an overall catalyst for fuel conversion can be a reduction or mitigation of the tendency to form coke in the presence of olefins.

Catalytic Composition—Reforming Components

In various aspects, at least a portion of the catalytic composition can correspond to a reforming catalyst that includes at least one metal suitable for reforming of hydrocarbons or hydrocarbon-like compounds. Often the reforming catalyst composition can further include one or more metal oxide components that act as a support for at least a portion of the metal catalyst. Optionally, a portion of the support for the metal catalyst can correspond to a zeolite, such as a medium pore or large pore molecular sieve with cracking activity, or a CHA framework type molecular sieve (or another small pore molecular sieve) with methanation activity. The reforming catalyst can correspond to about 5 wt % to about 70 wt % of the weight of the hydrocarbon-reforming catalyst composition, or about 5 wt % to about 50 wt %, or about 10 wt % to about 70 wt %, or about 10 wt % to about 50 wt %, or about 20 wt % to about 70 wt %, or about 20 wt % to about 50 wt %.

The one or more metal oxide components may be selected from any suitable metal oxide(s). Exemplary metal oxides can include, but are not necessarily limited to, aluminum oxides, silicon oxides, rare-earth metal oxides, Group IV metal oxides (e.g., $Al_2O_3$, including $\theta\text{-}Al_2O_3$ and/or $\gamma\text{-}Al_2O_3$), $SiO_2$, $Y_2O_3$, $Sc_2O_3$, $La_2O_3$, $CeO_2$, $Pr_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $TiO_2$, $Zr/HfO_2$, and mixtures thereof. For example, embodiments of a metal oxide mixture suitable for use in the catalyst compositions herein may include from about 1.0 wt % to about 99.0 wt %, based on the weight of the reforming catalyst, of a first metal oxide. For example, the first metal oxide content in the reforming catalyst can be from about 2.5 wt % to about 95.0 wt %, or from about 5.0 wt % to about 80.0 wt %, or from about 10.0 wt % to about 55.0 wt %, or from about 20.0 wt % to about 40.0 wt %. A second metal oxide may optionally be present in an amount from about 1.0 wt % to about 99.0 wt % relative to the weight of the reforming catalyst. For example, the amount of the second metal oxide can be from about 97.5 wt % to about 5.0 wt %, or from about 95.0 wt % to about 20.0 wt %, or from about 90.0 wt % to about 45.0 wt %, or from about 80.0 wt % to about 60.0 wt %.

In particular embodiments, the first metal oxide may itself be a mixture of oxides disclosed herein. For example, in an embodiment, the first metal oxide is a mixture of $La_2O_3$ and $\gamma\text{-}Al_2O_3$. For a mixture of $La_2O_3$ and $\gamma\text{-}Al_2O_3$, or more generally for a mixture of $La_2O_3$ and $Al_2O_3$, the $La_2O_3$ can correspond to about 0.4 wt % to about 20 wt % of the combined weight of $La_2O_3$ and $Al_2O_3$. For example, the $La_2O_3$ can correspond to at least about 0.4 wt % of the combined weight of $La_2O_3$ and $\gamma\text{-}Al_2O_3$, or at least about 1.0 wt %, or at least about 2.0 wt %, or at least about 5.0 wt %, or at least about 10.0 wt %, and/or about 20.0 wt % or less, or about 15.0 wt % or less, or about 10.0 wt % or less, or about 5.0 wt % or less, or about 2.0 wt % or less. It is noted that all combinations for the upper and lower limit of the amount of $La_2O_3$ relative to the combined amount of $La_2O_3$ and $Al_2O_3$ are expressly contemplated herein. The amount of the $La_2O_3$ and $\gamma\text{-}Al_2O_3$ together may be, for example, from about 20.0 wt % to about 90.0 wt %, such as from about 30.0 wt % to about 50.0 wt % or from about 32.5 wt % to about 37.5 wt %, based on the total weight of the reforming catalyst. Optionally, in such embodiments, the second metal oxide may itself also be a mixture of oxides disclosed herein. For example, the second metal oxide may comprise $CeO_2$ and $ZrO_2$. The amount of the $CeO_2$ and $ZrO_2$ together may be, for example, from about 10.0 wt % to about 80.0 wt %, such as from about 15.0 wt % to about 70.0 wt % or from about 20.0 wt % to about 65.0 wt %, or from about 30.0 wt % to about 60.0 wt %, or from about 40.0 wt % to about 80.0 wt %, based on the total weight of the catalyst composition. The Ce:Zr atomic ratio may be about, e.g., 10:0.5, 7.5:0.5, 5.0:1.0, 4.0:1.0, 3.0:1.0, 2.0:1.0, 1.0:1.0, or the like, or anywhere therewithin.

The at least one metal suitable for reforming may be selected from the group consisting of Co, Ru, Rh, Pt, Pd, Fe, Ni, Ir, Zn, Re and mixtures thereof. It will be understood that reference to the presence of such metals envisions their presence in elemental/and or compound form. Thus, amounts of such compounds refer to the total amount of metal, in the form or metal or in compound form, based on the total weight of the reforming catalyst. The amount of metal in the reforming catalyst may range from about 1.0 wt % to about 50 wt %, or about 0.25 wt % to about 10 wt %, relative to the weight of the reforming catalyst. For example, the amount of metal can be from about 1.0 wt % to about 20.0 wt %, or from about 2.5 wt % to about 17.5 wt %, or from about 5.0 wt % to about 15.0 wt %, or from about 7.5 wt % to about 10.0 wt %, or from about 1.0 wt % to about 10.0 wt %, based on the weight of the reforming catalyst. Optionally, the reforming catalyst can include a combination of two or more metals with reforming activity, with the total weight of the combined metals corresponding to the weight ranges described above. For example, a first metal can include or be Rh and a second metal can include or be Pt, e.g., such that the reforming catalyst comprises from about 0.25 wt % to about 6.0 wt % Rh, or from about 1.0 wt % to about 6.0 wt %, or from about 1.5 wt % to about 5.0 wt %, or from about 2.0 wt % to about 4.5 wt %, or from about 2.5 wt % to about 4.0 wt % Rh and from about 0.5 wt % to about 5.0 wt % Pt, or from about 0.75 wt % to about 3.0 wt %, or from about 1.0 to about 2.0 wt % Pt, based on the total weight of the reforming catalyst.

In some aspects, the reforming catalyst (comprising the support, supported metals, and optionally any molecular sieves) can comprise >~80.0 wt %, or from about 82.5 wt % to about 100.0 wt %, or from about 85.0 wt % to about 99.0 wt %, or from about 87.5 wt % to about 95.0 wt % of particles having a size of 20-100 mesh (U.S.) (e.g., 25-90 mesh, 30-85 mesh, or 35-80 mesh). A more particular description for indicating particle size distribution using mesh size can be to use + and – designations. A "+" before the sieve mesh indicates the particles are retained by the sieve, while a "–" before the sieve mesh indicates the particles pass through the sieve. This means that typically 90% or more (e.g., 95% or more, or 98% or more, or 99.5% or more) of the particles will have mesh sizes between the two values. For instance, if the particle size of a material is described as –80/+170, then 90% or more of the material will pass through an 80 mesh sieve and be retained by a 170 mesh sieve. Thus, in some embodiments, the catalyst composition may have a particle size distribution of –20/+100 mesh, e.g., –25/+90 mesh, –30/+85 mesh, or –35/+80 mesh. It should be noted that the particle size range specified above pertains to the particular test reactor that was utilized for some of the catalytic test of catalysts described herein. The preferred particle size range can change for different reactors and/or converter embodiments used in a vehicle application.

Another optional way of describing particle size distribution refers to respective percentiles of log normal particle size distribution determined by means of a Malvern™ particle size analyzer using a hexane diluent. Thus, particles having a $D_{50}$ of, for example, 0.5 mm have a median particle size of 0.5 mm. A $D_{90}$ of 0.5 mm indicates that 90% of the particles have a particle size of less than 0.5 mm, and a $D_{10}$ of 0.5 mm indicates that 10% of the particles have a particle size of less than 0.5 mm. The width or narrowness of a particle size distribution can be given by its span. The span is defined as $(D_{90}-D_{10})/(D_{50})$ and is therefore dimensionless. In some embodiments, the catalyst composition may be characterized as having a $D_{50}$ from 0.15 mm to 1.0 mm (e.g., from 0.85 mm to 0.16 mm, from 0.60 mm to 0.17 mm, or from 0.50 mm to 0.20 mm) and/or as having a span from about 0.5 to about 10, e.g., from 1.0 to 6.0, from 2.0 to 5.0, or from 3.0 to 4.0.

In other aspects, a reforming catalyst and/or cracking catalyst (including dehydrocracking catalyst) and/or methanation catalyst as described herein can be provided in a reformer (or other reaction environment) in the form of a washcoated monolithic converter. This type of catalyst embodiment for providing a supported catalyst is commonly used for automotive converters. In such an aspect, the catalyst composition can be deposited on or otherwise supported on a flow through substrate with parallel or tortuous channels. The reactive gases can enter a plurality of channels at the front end of the converter and exit the same channels at the rear end of the converter. In another embodiment used, for example, for particulate filtration on diesel engines, half of the channels of the monolith can be plugged on the inlet side of the monolith and the alternate half of the channels can be plugged on the outlet side of the substrate. In this so-called wall flow substrate, the exhaust can enter the portion of the channel system that is open on the inlet side. At least a portion of the exhaust can then pass through the walls of the porous substrate and exit the substrate through the other half of the channel system. The monolith substrate can be made of, for example, ceramic or metal. Ceramic substrate materials include cordierite, SiC, alumina, titania and other oxides or mixtures of oxides. The catalyst can typically be supported on the substrate in the form of a washcoat. An example of the preparation and application of washcoats for monolithic catalysts is described in the literature "Catalytic Air Pollution" by Ronald M. Heck and Robert J. Farrauto published by Van Nostrand Reinhold, 1995. The preparation of a monolith substrate typically includes the preparation of a slurry containing the catalyst powder and typically a binder material suspended in a liquid phase. The catalyst containing slurry can then be washcoated onto the substrate. The washcoated substrate can then be subsequently dried and calcined in air or annealed in specified gas environments.

Catalytic Composition—Cracking Component

In some aspects, the catalytic composition can further include a catalyst that includes one or more zeolites that provide cracking activity. In such aspects, at least one zeolite can correspond to MCM-68, another MSE framework zeolite, ZSM-5, another MFI framework zeolite, or a combination thereof. The MCM-68 and/or ZSM-5 (and/or other MSE/MFI framework zeolite) can have a silicon to aluminum atomic ratio of about 5 to about 100 or about 10 to about 40. If more than one zeolite is present, other suitable zeolites can include medium pore and/or large pore zeolites. The cracking catalyst can correspond to about 10 wt % to about 80 wt % of the weight of the catalytic composition, or about 10 wt % to about 50 wt %, or about 20 wt % to about 80 wt %, or about 20 wt % to about 50 wt %, or about 30 wt % to about 80 wt %, or about 30 wt % to about 50 wt %.

For zeolite(s) with cracking activity, the zeolites can correspond to from about 1.0 wt % to about 99.75 wt % of the cracking catalyst, based on the weight of the cracking catalyst. For example, the amount of zeolite can be from about 2.5 wt % to about 95.0 wt %, or from about 5.0 wt % to about 80.0 wt %, or from about 10.0 wt % to about 55.0 wt %, or from about 20.0 wt % to about 40.0 wt %.

When an additional zeolite other than an MSE or MFI framework zeolite is present, the additional zeolites can optionally correspond to at least one medium pore (10 member-ring pore) aluminosilicate zeolite having a Constraint Index of 1-12 (as defined in U.S. Pat. No. 4,016,218). An example of another suitable zeolite can be a zeolites having an MEL framework, such as ZSM-11. With regard to zeolites that include heteroatoms different from silicon and aluminum in the zeolite framework, non-limiting examples of SAPO and AlPO molecular sieves having a zeolitic framework structure can include one or a combination of SAPO-11, SAPO-31, SAPO-41, AlPO-11, AlPO-31, AlPO-41 and PST-6. Optionally, a zeolite can also be at least one large pore aluminosilicate, aluminophosphate, or silicoaluminophosphate zeolite containing 12-member ring pores.

The MSE and/or MFI framework zeolite can further include a transition metal in the form of Zn, Ga, or a combination thereof. The transition metal can be incorporated into the zeolite by any convenient method, such as by impregnation or by ion exchange. The amount of Zn and/or Ga can be about 0.1 wt % to about 20 wt % of the weight of the cracking catalyst, or at least about 0.2 wt %, or at least about 0.5 wt %, or at least about 0.7 wt %, or at least about 0.9 wt %, and/or about 5.0 wt % or less, or about 3.0 wt % or less, or about 2.5 wt % or less, or about 2.0 wt % or less, or about 1.5 wt % or less, or about 1.1 wt % or less. In particular, the amount of Zn and/or Ga can be about 0.2 wt % to about 3.0 wt % relative to the weight of the cracking catalyst, or about 0.7 wt % to about 3.0 wt %, or about 0.7 wt % to about 2.5 wt %, or about 0.9 wt % to about 3.0 wt %, or about 0.7 wt % to about 2.5 wt %, or about 0.2 wt % to about 1.5 wt %, or about 0.7 wt % to about 1.5 wt %.

Optionally, the MSE and/or MFI framework zeolite can include phosphorus. Including phosphorus can potentially provide increased stability for a zeolite in the reaction conditions present during reforming and/or methanation as described herein. The weight of the phosphorus can be about 0.1 wt % to about 10.0 wt % based on the weight of the cracking catalyst, or about 0.1 wt % to about 5.0 wt %, or about 0.1 wt % to about 3.0 wt %. It is noted that the total weight of the phosphorus shall not include amounts attributable to the zeolite itself due to the presence of phosphorus in the framework of the zeolitic structure.

Catalytic Composition—Optional Methanation Component

In some aspects, the catalytic composition can further include a methanation catalyst that comprises an 8-member ring (small pore) zeolitic structure, such as a zeolite having the CHA framework type. Optionally, at least a portion of a metal suitable for reforming can be supported on the small pore molecular sieve. In some aspects, the metal suitable for reforming that is supported on the small pore molecular sieve can be rhodium. Supporting at least a portion of the (reforming) metal on the small pore molecular sieve can enhance the production of methane (via methanation) in the reforming environment. The methanation catalyst can correspond to about 5 wt % to about 70 wt % of the weight of the catalytic composition, or about 5 wt % to about 50 wt %, or about 10 wt % to about 70 wt %, or about 10 wt % to about 50 wt %, or about 20 wt % to about 70 wt %, or about 20 wt % to about 50 wt %.

In this discussion, unless specifically noted otherwise, references to CHA framework type zeolites are understood to generally refer to any zeolite (or other molecular sieve) having the chabazite framework type. The chabazite framework type is designated as framework type code CHA in the International Zeolite Association database of zeolite structures. Other zeolites having the CHA framework type can include AlPO-34, MCM-2, MeAPO-44, MeAPO-47, SAPO-34, SAPO-47, SSZ-13, SSZ-62, and ZK-14. Chabazite can refer to a naturally occurring or a synthetic form of chabazite. Unless otherwise specified, a reference to chabazite is understood to generally refer to the zeolite chabazite (natural or synthetic), optionally containing any of the potential various counterions and/or additional metals that can be present.

While rhodium supported on CHA framework type zeolite can effectively enhance the formation of methane, additional rhodium supported multi-dimensional small pore molecular sieves can also be effective. Suitable small pore molecular sieves include those having the AEI, AFT, AFX, ATT, DDR, EAB, EPI, ERI, KFI, LEV, LTA, MER, MON, MTF, PAU, PHI, RHO, and SFW framework types.

Another option for characterizing small pore zeolites can be based on the ring structures in the zeolites. Some suitable small pore zeolites can include molecular sieves having an 8-member ring channel as the largest pore size for the molecular sieve.

Still another option for characterizing small pore zeolites can be based on the effective size of the pore channels. Some typical small pore zeolites can include zeolites with a largest pore channel having a maximum dimension of about 5.0 Angstroms or less. A zeolite having elliptical pores with a slightly larger maximum dimension of about 5.1 Angstroms or about 5.2 Angstroms along the major axis may still correspond to a small pore zeolite if the minor axis has a dimension of about 4.0 Angstroms or less. In still other aspects, a suitable small pore zeolite can include a largest pore channel that has a maximum dimension of about 4.5 Angstroms or less, or about 4.4 Angstroms or less, or about 4.3 Angstroms or less. In such a zeolite, the largest pore channel can also have a minimum dimension of at least about 3.5 Angstroms, or at least about 3.6 Angstroms, or at least about 3.7 Angstroms. In this discussion, the maximum and minimum dimensions of a pore channel for a zeolite refer to the size of a sphere that can diffuse through such a pore channel, as reported in the Database of Zeolite Structures that is maintained by the International Zeolite Association.

In various aspects, the weight of the CHA framework type zeolite (or other small pore zeolite) in the methanation catalyst, and/or the weight of chabazite in the methanation catalyst, can be from about 1.0 wt % to about 99.75 wt %, based on the total weight of the catalyst composition. For example, the weight of chabazite can be from about 2.5 wt % to about 95.0 wt % relative to the weight of the methanation catalyst, or from about 5.0 wt % to about 80.0 wt %, or from about 10.0 wt % to about 55.0 wt %, or from about 20.0 wt % to about 40.0 wt %.

In some aspects, the methanation catalyst can also include at least one metal suitable for reforming. This can include aspects where the metal is Rh or includes Rh. Alternatively, a first metal can be supported on the metal oxide support portion of the reforming catalyst while a second metal, preferably Rh, is supported on the small pore molecular sieve of the methanation catalyst.

For the methanation catalyst, the at least one metal suitable for reforming may be selected from the group consisting of Co, Ru, Rh, Pt, Pd, Fe, Ni, Ir, Zn, Re and mixtures thereof. It will be understood that reference to the presence of such metals envisions their presence in elemental/and or compound form. Thus, amounts of such compounds refer to the total amount of metal, in the form or metal or in compound form, based on the total weight of the methanation catalyst. The amount of metal in the methanation catalyst may range from about 1.0 wt % to about 50 wt %, or 0.25 wt % to 10 wt %, relative to the weight of the methanation catalyst. For example, the amount of metal can be from about 1.0 wt % to about 20.0 wt %, or from about 2.5 wt % to about 17.5 wt %, or from about 5.0 wt % to about 15.0 wt %, or from about 7.5 wt % to about 10.0 wt %, or from about 1.0 wt % to about 10.0 wt %, based on the weight of the methanation catalyst. Optionally, the methanation catalyst can include a combination of two or more metals with reforming activity, with the total weight of the combined metals corresponding to the weight ranges described above. For example, a first metal can include or be Rh and a second metal can include or be Pt, e.g., such that the methanation catalyst comprises from about 0.25 wt % to about 6.0 wt % Rh, or from about 1.0 wt % to about 6.0 wt %, or from about 1.5 wt % to about 5.0 wt %, or from about 2.0 wt % to about 4.5 wt %, or from about 2.5 wt % to about 4.0 wt % Rh and from about 0.5 wt % to about 5.0 wt % Pt, or from about 0.75 wt % to about 3.0 wt %, or from about 1.0 to about 2.0 wt % Pt, based on the total weight of the methanation catalyst.

Reforming and Methanation in an Engine or Power Train Environment

The catalytic composition can advantageously be suitable for providing a sufficient amount of heat to sustain a reforming reaction to produce syngas containing hydrogen within an engine environment. Typically, the catalytic composition can provide, e.g., greater than about 1.0 mol % $CH_4$, such as from about 1.0 mol % to about 30 mol % $CH_4$, or from about 1.0 mol % to about 25 mol %, or from about 1.0 mol % to about 20 mol %, or from about 1.0 mol % to about 10 mol %, or from about 1.0 mol % to about 5.0 mol % $CH_4$, or from about 1.0 mol % to about 4.0 mol % $CH_4$, or from about 1.0 mol % to about 3.5 mol % $CH_4$, or from about 2.0 mol % to about 20 mol %, or from about 2.0 mol % to about 10 mol %, or from about 2.0 mol % to about 6.0 mol % $CH_4$, or from about 2.0 mol % to about 5.0 mol % $CH_4$, or from about 1.0 mol % to about 4.0 mol % $CH_4$, or from about 1.0 mol % to about 3.5 mol % $CH_4$, based on the total moles of gas in the reformed gaseous mixture, thereby optionally maintaining the average reformer temperature at or above about 450° C., e.g., above about 500° C., above about 550° C., above about 600° C., above about 650° C., from about 450° C. to about 650° C., from about 500° C. to about 650° C., from about 550° C. to about 600° C., from about 450° C. to about 550° C., or from about 475° C. to about 525° C. In one embodiment, the inlet temperature can be about 550° C. and the outlet temperature about 450° C. In other aspects, the outlet temperature of the reformer can be at least about 435° C., or at least about 450° C., or at least about 465° C., or at least about 475° C. The inlet temperature can be about 650° C. or less, or about 600° C. or less, or about 585° C. or less, or about 575° C. or less, or about 560° C. or less, or about 550° C. or less. Maintaining a desired temperature for the reformer inlet can allow for an effective amount of reforming while still maintaining a desired reformer outlet temperature under adiabatic operation. The catalyst composition may optionally be characterized as providing a gaseous mixture having $CH_4:H_2$ ratio (mole/mole) of at least about 0.075 to 1.0, or from 0.1:1 to 0.9:1, or from 0.1:1 to 0.75:1, or from 0.25:1 to 0.9:1, or from 0.25:1 to 0.75:1, e.g., wherein the mixture is substantially/essentially free of oxygen-containing gas other than exhaust gas from the engine and hydrocarbon-containing fuel.

One option for maintaining and/or increasing the temperature of a reforming reactor can be to use pre-combustion of a portion of the fuel as a source of heat for the reforming reactor. Pre-combustion can allow the inlet temperature for the reforming reactor to be varied without having to vary some other temperature within the engine. Conventionally, pre-combustion of fuel to provide heat for a reformer in an engine is not preferred, as any fuel burned to heat the reformer represents fuel that cannot be used to drive the powertrain. However, due to kinetic and or thermodynamic limitations on the reforming reactions at low temperature, using pre-combustion can allow increasing the amount of conversion before the kinetic or thermodynamically limited temperature is reached. For example, pre-combustion can allow the inlet temperature of the reformer to be increased to a temperature of about 525° C. to about 650° C., or about 525° C. to about 625° C., or about 525° C. to about 600° C., or about 550° C. to about 650° C., or about 550° C. to about 625° C., or about 550° C. to about 600° C. The resulting increase in enthalpy of the product mix due to the reforming reaction can raise the heat of combustion, which can essentially offset the loss in efficiency due to the pre-combustion. This can be desirable up to a point where raising the feed temperature by pre-combustion would lead to significant heat losses to the surrounding; e.g., a temperature over about 650° C. In some aspects, the above amounts of $CH_4$ in the reformed gaseous mixture can be provided when the mixture of exhaust gas and hydrocarbon-containing fuel introduced into the reformer includes about 5.0 mol % or less of $CH_4$, or about 4.0 mol % or less, or about 3.0 mol % or less, or about 2.0 mol % or less, or about 1.0 mol % or less. Additionally or alternatively, the above amounts of $CH_4$ in the reformed gaseous mixture can be provided when the hydrocarbon-containing fuel introduced into the reformer includes about 5.0 mol % or less of $CH_4$, or about 4.0 mol % or less, or about 3.0 mol % or less, or about 2.0 mol % or less, or about 1.0 mol % or less.

In some aspects, the invention can include a reformer for use in an exhaust gas recycle portion of an internal combustion engine powertrain, said reformer comprising at least one catalyst composition described herein. Such a reformer may be used in a method of operating an internal combustion engine. This may be accomplished, e.g., by providing an exhaust gas-containing mixture to an exhaust gas recycle reformer. The exhaust gas-containing mixture can typically comprise engine exhaust gas and a first hydrocarbon-containing fuel. At least a portion of the exhaust gas-containing mixture can be passed to the reformer and converted by the catalyst composition in the presence of heat to a reformed gaseous mixture (product) having an increased content of $H_2$ relative to the mixture of exhaust gas and first hydrocarbon-containing fuel. The reformed gaseous mixture and a second hydrocarbon-containing fuel may be provided to the engine for combustion. Typically, the second hydrocarbon-containing fuel can be the same as the first hydrocarbon-containing fuel (i.e., it can be convenient to draw both the first and second hydrocarbon-containing fuels from a common source or tank, in some embodiments), although this need not always be the case. Where desired, the second hydrocarbon-containing fuel may be different from the first hydrocarbon-containing fuel. The reformed gaseous mixture and second hydrocarbon-containing fuel can then be combusted in the engine to form an exhaust gas. The exhaust gas can be passed through a first heat exchanger to extract heat therefrom. The heat can be transferred to the reformer to aid in sustaining the reforming reactions therein.

An important direction in future gasoline engines is use of exhaust gas recycle (EGR). In some aspects, use of recycled exhaust gas as part of the input fuel mixture to the engine can lower the temperature for combustion. This can allow the engine to run at a higher compression ratio without causing knocking, which can provide increased efficiency. However, the compression ratio and amount of exhaust gas recycle are limited conventionally by practical concerns. Increasing the amount of exhaust gas recycle in a conventional engine can cause the fuel delivered to the engine to become too dilute, leading to problems with the fuel flame speed. Additionally, the compression ratio can be limited by the fuel octane rating, or resistance of a fuel to combustion prior to spark ignition.

In various aspects, use of exhaust gas recycle with reforming of fuel prior to combustion can allow for increased use of the exhaust gas recycle. For example, use of EGR can provide a media with $H_2O$ and $CO_2$ as reactants for reforming of gasoline to produce $H_2$ rich gas to raise flame speed and/or methane to raise the octane. Typical ranges for EGR that can be used for the engine in conjunction with reforming include at least 10% as typically defined in the automotive industry, or 10% to 50%. For example, the amount of EGR can be at least about 10%, or at least about 20%, or at least about 25%, or at least about 30%, or at least about 35%, and/or about 50% or less, or about 45% or less, or about 40% or less, or about 35% or less. It is noted that each of the lower limits and upper limits for the amount of exhaust gas recycle are explicitly contemplated in combination with each other. All or a portion of this EGR can be fed in conjunction with the gasoline (or other fuel) from tankage to the reformer. The desired amount of EGR relative to feed to the reformer can depend on fuel input, engine design and engine load points. A high level of EGR increases the amount of $H_2O$ and $CO_2$ available for reforming, which can potentially mitigate the extent of coke formation in the reformer. Alternatively, lowering EGR can raise the fuel concentration and thereby can enhance the kinetics for conversion.

In some aspects, the reforming reaction can be performed in the presence of a reduced or minimized amount of water. During conventional reforming, the ratio of the amount of water in the reaction environment to the number of carbon atoms in the feed for reforming can be at least about 3 to 1. It has been determined that by performing the reforming in the presence of a suitable catalyst, the ratio of water to carbon atoms in the feed can be from about 0.3 to 1.0 to about 1.0 to 1.0, or about 0.5 to 1.0 to about 1.0 to 1.0, or about 0.3 to 1.0 to about 0.9 to 1.0. Operating the reforming with a reduced amount of water can be beneficial, as this amount of water can be provided by an exhaust gas recycle stream.

Thus, embodiments of the invention can include a reformer for use in an exhaust gas recycle portion of an internal combustion engine powertrain, said reformer comprising at least one catalyst composition described herein. The catalyst composition can be specifically configured to convert a mixture comprising an internal combustion engine exhaust gas and a hydrocarbon-containing fuel to a gaseous mixture comprising $H_2$, $CO_2$, CO, $H_2O$, $N_2$, and greater than about 1.0 mol % $CH_4$, based on the total moles of gas in the gaseous mixture. It is noted that the output from the reformer may often contain a variety of additional components. For example, in aspects where the input flow to the reformer contains aromatic compounds and/or longer chain aliphatic compounds, the reformer output can typically include one or more types of aromatic compounds. This can include benzene formed by dealkylation of alkylated aromatics; aromatic compounds formed by dehydrocylclization of aliphatic compounds; or other types of aromatics, optionally including substituted aromatics. More generally, the output flow from the reformer can include a mixture of various aliphatic, cyclic, and/or aromatic compounds, optionally including compounds containing heteroatoms other than C and H.

Such a reformer may be used in a method of operating an internal combustion engine. The methane produced in the reformer may be used for using methane-assisted combustion in the engine. This may be accomplished, e.g., by providing an exhaust gas-containing mixture to an exhaust gas recycle reformer. The exhaust gas-containing mixture can typically comprise engine exhaust gas and a first hydrocarbon-containing fuel. At least a portion of the exhaust gas-containing mixture can be passed to the reformer and converted by the catalyst composition in the presence of heat to a reformed gaseous mixture (product) comprising $CH_4$, $H_2$, $CO_2$, CO, $H_2O$, and $N_2$, said $CH_4$ being present at a concentration greater than about 1.0 mol %, based on the total moles of gas in the reformed gaseous mixture. The reformed gaseous mixture and a second hydrocarbon-containing fuel may be provided to the engine for combustion. Typically, the second hydrocarbon-containing fuel can be the same as the first hydrocarbon-containing fuel (i.e., it can be convenient to draw both the first and second hydrocarbon-containing fuels from a common source or tank, in some embodiments), although this need not always be the case. Where desired, the second hydrocarbon-containing fuel may be different from the first hydrocarbon-containing fuel. The reformed gaseous mixture and second hydrocarbon-containing fuel can then be combusted in the engine to form an exhaust gas. The exhaust gas can be passed through a first heat exchanger to extract heat therefrom. The heat can be transferred to the reformer to aid in sustaining the reforming and methane-forming reactions therein.

The use of the catalyst compositions herein can serve to provide an increase in the octane rating of an internal combustion engine exhaust gas stream. An exhaust gas-containing mixture may be provided to an exhaust gas recycle reformer including a catalyst as described herein. The exhaust gas-containing mixture can typically comprise engine exhaust gas and a first hydrocarbon-containing fuel. The first hydrocarbon-containing fuel can typically have a relatively low initial octane rating, such as from about 65 RON to about 100 RON. The catalyst composition in the reformer converts at least a portion of the exhaust gas-containing mixture to a reformed gaseous mixture having a second octane rating (RON) higher than the initial octane rating of the first hydrocarbon-containing fuel. Typically, the reformed gaseous mixture can comprise at least $H_2$, $CO_2$, and greater than about 0.25 mol % $CH_4$, or greater than about 0.4 mol % $CH_4$, or greater than about 1.0 mol % $CH_4$, or greater than about 1.5 mol % $CH_4$, or greater than about 2.0 mol % $CH_4$, and/or about 30 mol % $CH_4$ or less, or about 25 mol % $CH_4$ or less, or about 20 mol % $CH_4$ or less, based on the total moles of gas in the reformed gaseous mixture (and typically also CO, $H_2O$, and $N_2$), and this total mixture can advantageously have a second octane rating of >100, e.g., from about 100 to about 125.

The reformer may also be incorporated into an internal combustion engine powertrain. Many different variations of such power trains are known. One such powertrain envisioned can include an internal combustion engine having an exhaust manifold and a fuel intake manifold. A reformer comprising a catalyst composition as described herein can fluidly connect a branch of the exhaust manifold and the fuel intake manifold. The reformer and catalyst composition can be specifically configured to convert an exhaust gas-containing mixture from the exhaust manifold gas and a first hydrocarbon-containing fuel to a reformed gaseous mixture comprising $H_2$, CO, and $CH_4$, along with one or more exhaust gas constituents—typically including $N_2$, $H_2O$, $CO_2$, trace quantities of minor species such as $NO_x$ and $SO_x$, and the like. The reformed gaseous mixture may be characterized by one or more of the following: (i) a Research Octane Number (RON) of >100, e.g., from about 100 to about 130, or from about 105 to about 125, or from about 110 to about 125, or from about 115 to about 125, or from about 120 to about 125); (ii) a $CH_4$ content of greater than about 1.0 mol % (e.g., from about 1.0 mol % to about 30 mol % $CH_4$, from about 1.5 mol % to about 20 mol % $CH_4$, or from about 2.0 mol % to about 10 mol % $CH_4$, based on the number of moles of gas in the reformed fuel mixture); (iii) a selectivity for formation of $CH_4$ as a conversion product of at least 5.0 mol %, or at least 10 mol %, or at least 20 mol %, relative to the total moles of product carbon atoms from converted feed hydrocarbons from the converting under reforming conditions; and/or (iv) a mixture of $H_2$, CO, $CO_2$, $H_2O$, and $CH_4$ (optionally also $N_2$) characteristic of at least about 50% (e.g., at least about 80%, at least about 85%, at least about 90%, or at least about 95%) conversion in the reforming zone. Conversion of a hydrocarbon feed should be understood to be calculated solely by the ratio of the difference between the mass (or number of moles) of hydrocarbon component of the feed entering the inlet of the reforming zone and the mass (or number of moles) of hydrocarbon component exiting the outlet of the reforming zone, divided by the mass (or number of moles) of hydrocarbon component of the feed entering the inlet of the reforming zone. Typically, the intake manifold can be configured to provide a reformed fuel mixture from the exhaust gas recycle unit and a second hydrocarbon-containing fuel to the internal combustion engine for combustion. As described above, the first and second hydrocarbon-containing fuels may be the same or different.

The stream from an exhaust gas recycle unit (EGR stream) can comprise substantially components from the exhaust of the engine, which may represent a portion or substantially all the exhaust from the engine. This EGR stream typically comprises $N_2$, water vapor ($H_2O$), $CO_2$, and un-combusted hydrocarbons and small amounts of CO and $O_2$. The hydrocarbon-containing fuel can be a conventional fuel, such as gasoline, and may optionally be the primary fuel supplied to the engine by direct injection into the engine. However, other fuels can be used instead of or in combination with the conventional fuel (gasoline). Other such fuels can include, but are not necessarily limited to, LPG (liquefied petroleum gas), light ends, $C_2$-$C_{12}$ paraffins, naphtha, kerosene, diesel, FCC off-gas, oxygenated hydrocarbons (e.g., dialkyl ethers such as dimethyl ether, diethyl ether, methyl ethyl ether, and the like, and combinations thereof; $C_1$-$C_{12}$ alcohols such as methanol, ethanol, 1-propanol, isopropanol, 1-butanol, 2-butanol, isobutanol, a pentanol, a hexanol, and the like, and combinations thereof;

fatty acid alkyl esters, for instance from mono-, di-, and/or tri-glyceride reaction with a $C_1$-$C_4$ alcohol, such as represented by FAME, FAEE, and the like, and combinations thereof; and the like; and combinations thereof), hydrocarbon-rich gas overhead from a refinery process, hydrocarbon-rich off-gas from a chemical process, or the like, or combinations thereof.

Whatever fuel is used as a feed in the methods described herein, it can advantageously have one, two, or all of the following characteristics: a relatively high paraffin content, no more than a modest aromatics content, and a relatively small content of polynuclear aromatics (PNAs, meaning compounds having two or more aromatic rings in its structure, typically two or more aromatic rings connected to each other, e.g., sharing two carbon atoms between them). The overall aromatics content of the hydrocarbon-containing fuel to be fed into the reforming zone can advantageously be no more than about 35 vol % (e.g., no more than about 30 vol %, no more than about 25 vol %, no more than about 20 vol %, no more than about 15 vol %, or no more than about 10 vol %), based on the weight of the hydrocarbon-containing fuel (optionally, the fuel can additionally have some aromatics content, e.g., at least about 0.1 vol %, at least about 0.5 vol %, at least about 1 vol %, at least about 2 vol %, at least about 3 vol %, at least about 4 vol %, at least about 5 vol %, at least about 7 vol %, at least about 10 vol %, or at least about 15 vol %, based on the weight of the hydrocarbon-containing fuel). Additionally or alternately, the PNA content of the hydrocarbon-containing fuel to be fed into the reforming zone can advantageously be no more than about 3 vol % (e.g., no more than about 2 vol %, no more than about 1 vol %, no more than about 0.5 vol %, or no more than about 0.1 vol %), based on the weight of the hydrocarbon-containing fuel (though PNAs can typically be undesirable for relatively high conversion in reforming, the fuel may nonetheless optionally have some PNA content, e.g., at least about 0.001 vol %, at least about 0.005 vol %, at least about 0.01 vol %, at least about 0.03 vol %, at least about 0.05 vol %, at least about 0.07 vol %, at least about 0.1 vol %, at least about 0.2 vol %, at least about 0.3 vol %, or at least about 0.5 vol %, based on the weight of the hydrocarbon-containing fuel). Further additionally or alternately, the paraffin content of the hydrocarbon-containing fuel to be fed into the reforming zone can advantageously be greater than about 10 vol %, for example about 10 vol % to about 99 vol %, or about 40 vol % to about 95 vol %, or about 60 vol % to about 99 vol %. With regard to the paraffin content, the catalyst composition described herein can be beneficial for conversion of isoparaffins. The isoparaffin content of the hydrocarbon-containing fuel can be at least about 10 vol %, for example about 10 vol % to about 90 vol %, or about 35 vol % to about 80 vol %, or about 45 vol % to about 90 vol %.

In one embodiment, the generation of hydrogen in the powertrain can be accomplished by an initial endothermic reaction to produce syngas. The syngas-containing hydrogen is then used to conduct the methane-producing exothermic reaction described above, to thereafter sustain the temperature high enough for the endothermic reforming processes of reactor during operation. Alternatively, start-up hydrogen for the methane formation reaction may be supplied by stored hydrogen (not shown), which optionally may be replenished after start-up by operation of the reforming reaction.

EXAMPLES

Examples 1-7

For Examples 1-7, the catalysts in Table 1 were used to investigate conversion of various feeds. The preparation methods for catalysts A-N are described below.

TABLE 1

Catalysts for Examples 1-7

| Catalyst | Support | Metals loading, wt % | Type |
|---|---|---|---|
| A | $La_2O_3$—$Al_2O_3$—$CeO_2$—$ZrO_2$ | 3.5 Rh | Reforming |
| B | CHA | 1.5 Rh | Reforming, Methanation |
| C | MCM-68 | 0 | Cracking |
| D | MCM-68 | 0.9 Ga | Reforming + Methanation |
| E | MCM-68 | 1.1 Zn | Dehydrocracking |
| F | MCM-68 | 3.0 Zn | Dehydrocracking |
| G | MCM-68 | 0.7 Zn | Dehydrocracking |
| H | MCM-68 | 0.2 Zn | Dehydrocracking |
| I | MCM-68 | 0.9 Zn | Dehydrocracking |
| J | P-ZSM-5 | 0.9 Zn | Dehydrocracking |
| K | CHA | 0.35 Rh | Reforming, Methanation |
| L | P-ZSM-5 | 0.8 Rh + 0.8 Zn | Dehydrocracking |
| M | P-ZSM-5 | 0.0 | Acid Cracking |
| N | CHA | 1.31 Rh | Reforming + Methanation |

Preparation of Catalyst A:

Catalyst A included 3.5 wt % Rh supported on a mixed metal oxide comprising $La_2O_3$-γ-$Al_2O_3$ (36.5 wt % of total) and $CeO_2$—$ZrO_2$ (60 wt % of total). The $La_2O_3$—$Al_2O_3$ support was prepared separately by impregnation of an aqueous $La(NO_3)_3$ solution onto γ-$Al_2O_3$ (about 4.5 wt % $La_2O_3$). The impregnated γ-$Al_2O_3$ was dried and calcined at ~600° C. $CeO_2$—$ZrO_2$ was co-precipitated from an aqueous $Ce(NO_3)_4$ and $Zr(NO_3)_4$ solution onto the $La_2O_3$—$Al_2O_3$ support using urea as base. The Ce:Zr atomic ratio was ~4:1. The La-γ-$Al_2O_3$—$CeO_2$—$ZrO_2$ support was calcined at 600° C. prior to incipient wetness impregnation with an aqueous solution containing $Rh(NO_3)_3$. After the precious metal impregnation, the catalyst was calcined in air at ~600° C.

Preparation of Catalyst B:

A synthesis mixture was prepared with the composition (by weight) 2.15SDAOH:0.20Rh(en)$_3$Cl$_3$:7Na$_2$O:Al$_2$O$_3$: 25SiO$_2$:715H$_2$), where SDAOH is N,N,N-trimethyladamantammonium hydroxide. To form the synthesis mixture, 9.43 g of 25 wt % SDAOH and 0.76 g 50 wt % NaOH were combined with 21.09 g of sodium silicate (28.2% $SiO_2$, 9.3% $Na_2O$) and 41 g additional deionized water in a Teflon®-lined autoclave. Then 4.60 g of 10 wt % aqueous solution of $Rh(C_2H_4N_2)_3Cl_3.3H_2O$ was added drop wise with vigorous stirring, followed by stirring for an additional 10 minutes. Next 3.08 g of USY (Si/Al ratio=2.5, 17.5% $Al_2O_3$) was added and stirred for 2 minutes. The autoclave was mounted on a rotating shelf (25 rpm) in a 140° C. oven for 6 days. The product was recovered by vacuum filtration, washed with deionized water and dried in a 115° C. oven. Phase analysis by powder XRD showed the sample to be pure chabazite. The sample was calcined to remove the DSA by heating in a muffle furnace from 25° C. to 560° C. in two hours in air and then holding for 3 hours in air. Elemental analysis by X-ray fluorescence gave 1.53 wt % Rh.

Preparation of Catalyst C:

MCM-68 was synthesized according to the methods described in U.S. Patent Application Publication US 2014/0140921 (application Ser. No. 14/054,038, filed on Oct. 15, 2013). The portions of US 2014/0140921 related to synthesis of MCM-68 are incorporated herein by reference. The acid form of the zeolite was prepared by pre-calcining the MCM-68 crystal at 400° C. under nitrogen flow for 30 minutes, switching the purge gas from nitrogen to air while increasing the temperature to 600° C., and holding at 600° C. under flowing air for 2 hours. The pre-calcined material was then exchanged three times with $NH_4NO_3$ at 98° C. Between each exchange and at the completion of the three exchanges exhaustively wash the MCM-68 crystal with water and dry the crystal at 120° C. After exchanging the crystal for the first time, the ammonium form was calcined at 500° C. in air for 2 hours, and then subsequently steamed for 6 hours at 538° C. The steamed MCM-68 crystal was subsequently exchanged three more times as described previously with the pre-calcined powder. Finally, the ammonium exchanged material was calcined at 500° C. in air for 2 hours to create the acid form of the zeolite. The Si/Al ratio of catalyst C was about ~10.

Preparation of Catalyst D:

5 grams of MCM-68 in the H-form (similar to the MCM-68 described above as Catalyst C) was impregnated with a solution of 0.31 g of gallium (III) nitrate hydrate (99.9%) in 4 g deionized water. Afterwards the catalyst was dried for 4 hours at ambient conditions, and then for 16 hours at 121° C. The catalyst was then calcined in air (5 L/min flow rate) at 538° C. for 3 hours, with a 2.5 hour heating ramp. X-ray fluorescence analysis of the final catalyst revealed 0.9 wt % Ga supported on the catalyst.

Preparation of Catalyst E:

10 grams of MCM-68 in the H-form (similar to the MCM-68 described above as Catalyst C) was impregnated with a solution of 0.46 g of zinc nitrate hexahydrate (98%) in 8.0 g deionized water. Afterwards the catalyst was dried for 4 hours at ambient conditions, and then for 16 hours at 121° C. The catalyst was then calcined in air (5 L/min flow rate) at 500° C. for 4 hours, with a 2.5 hour heating ramp. X-ray fluorescence analysis of the final catalyst revealed 1.1 wt % Zn supported on the catalyst.

Preparation of Catalyst F:

5 grams of MCM-68 in the H-form (similar to the MCM-68 described above as Catalyst C) was impregnated with a solution of 0.70 g of zinc nitrate hexahydrate (98%) in 4.3 g deionized water. Afterwards the catalyst was dried for 4 hours at ambient conditions, and then for 16 hours at 121° C. The catalyst was then calcined in air (5 L/min flow rate) at 500° C. for 4 hours, with a 2.5 hour heating ramp. X-ray fluorescence analysis of the final catalyst revealed 3 wt % Zn supported on the catalyst.

Preparation of Catalyst G:

5 grams of MCM-68 in the H-form (similar to the MCM-68 described above as Catalyst C) was impregnated with a solution of 0.11 g of zinc nitrate hexahydrate (98%) in 4.3 g deionized water. Afterwards the catalyst was dried for 4 hours at ambient conditions, and then for 16 hours at 121° C. The catalyst was then calcined in air (5 L/min flow rate) at 500° C. for 4 hours, with a 2.5 hour heating ramp. X-ray fluorescence analysis of the final catalyst revealed 0.7 wt % Zn supported on the catalyst.

Preparation of Catalyst H:

5 grams of MCM-68 in the H-form (similar to the MCM-68 described above as Catalyst C) was impregnated with a solution of 0.06 g of zinc nitrate hexahydrate (98%) in 4.3 g deionized water. Afterwards the catalyst was dried for 4 hours at ambient conditions, and then for 16 hours at 121° C. The catalyst was then calcined in air (5 L/min flow rate) at 500° C. for 4 hours, with a 2.5 hour heating ramp. X-ray fluorescence analysis of the final catalyst revealed 0.2 wt % Zn supported on the catalyst.

Preparation of Catalyst I (Preparation by Ion Exchange):

5 grams of MCM-68 in the H-form (similar to the MCM-68 described above as Catalyst C) were slurried with a 4-fold excess of an aqueous solution of 1M zinc nitrate hexahydrate (98%) at room temperature and stirred for 1 hour. After filtration and washing with deionized water, the entire process was repeated twice more. The final filtered product was then dried for 16 hours at 121° C. The catalyst was then calcined in air (5 L/min flow rate) at 500° C. for 4 hours, with a 2.5 hour heating ramp. X-ray fluorescence analysis of the final catalyst revealed 0.9 wt % Zn supported on the catalyst.

Preparation of Catalyst J:

A self-bound ZSM-5 sample (Si/Al~30) was contacted with an aqueous solution of $H_3PO_4$ to the point of incipient wetness. The impregnated material was dried overnight at 121° C. in stagnant air, and treated subsequently in flowing dry air (5 volumes air/volume solids/min) for 3 hours at ~538° C. to produce calcined P-H-ZSM-5.

The resulting calcined P-H-ZSM-5 was then impregnated with zinc nitrate solution to incipient wetness. The solution was prepared by dissolving the appropriate amount of zinc nitrate salt into deionized water. The solution volume required for incipient wetness impregnation was determined using the absorption factor for the catalyst (g $H_2O$/g catalyst). The metal salt solution was then distributed over the P-H-ZSM-5 support and left at ambient conditions for 1 hour, followed by drying at 121° C. for 6 hours in flowing air (5 vol air/vol solids/min). The resulting solids were then treated at 538° C. for 3 hours in flowing air (5 vol air/vol solids/min). X-ray fluorescence analysis of the final catalyst J resulted in 0.9 wt % Zn and 1.5 wt % P.

Preparation of Catalyst K:

Catalyst K included 0.35 wt. % Rh supported on zeolite CHA. A synthesis mixture was prepared having the stoichiometry: ~0.064Rh:~3 SDAOH:~10 $Na_2O$:$Al_2O_3$:~35$SiO_2$:~1000$H_2O$, where SDAOH is N,N,N-trimethyladamantylammonium hydroxide. To form the synthesis mixture, 9.49 g of 25 wt % SDAOH and 0.46 g 50 wt % NaOH were combined with 23.01 g of sodium silicate (28.2% $SiO_2$, 9.3% $Na_2O$) and 43.74 g additional deionized water in a Teflon®-lined autoclave. Then 1.02 g of 10 wt % aqueous solution of $Rh(C_2H_4N_2)_3Cl_3.3H_2O$ was slowly added while mixing with a magnetic stir bar. Next 2.18 g of USY (Si/Al ratio=2.5, 17.5% $Al_2O_3$) was added and stirred. The autoclave was mounted in a tumbling oven (40 rpm) and reacted at 140° C. for 5 days. The product was recovered by vacuum filtration, washed with deionized water and dried in a 115° C. oven. Phase analysis by powder XRD showed the sample to be pure chabazite. The sample was calcined in a furnace from 25° C. to 560° C. in two hours in air using a ramp rate of 4.5° C./min. Elemental analysis by X-ray fluorescence showed the sample contained about 0.35 wt % Rh.

Preparation of Catalyst L:

2 grams of the 0.9% Zn/P-H-ZSM-5 corresponding to catalyst J was impregnated with a solution of 0.081 g of rhodium nitrate hydrate in 0.97 g deionized water. The catalyst was then dried for 4 hours at ambient conditions, followed by drying for 16 hours at 121° C. The catalyst was then calcined in air (5 L/min) at 500° C. for 4 hours, with a 2.5 hour heating ramp. X-ray fluorescence analysis showed that the catalyst included 0.8 wt % Zn and 0.8 wt % Rh on the catalyst.

Preparation of Catalyst M:

A self-bound ZSM-5 sample (Si/Al~30) was contacted with an aqueous solution of $H_3PO_4$ to the point of incipient wetness. The impregnated material was dried overnight at 121° C. in stagnant air, and treated subsequently in flowing dry air (5 volumes air/volume solids/min) for 3 hours at 538° C. The calcined sample contained 1.2 wt % P.

Preparation of Catalyst N:

Catalyst N included ~1.31 wt. % Rh supported on zeolite CHA. A synthesis mixture was prepared having the stoichiometry: ~0.2Rh:~2.15SDAOH:~7$Na_2O$:$Al_2O_3$:~25 $SiO_2$:~715 $H_2O$, where SDAOH is N,N,N-trimethyladamantylammonium hydroxide. For preparation of the synthesis mixture, to a plastic beaker were added ~20.7 g sodium silicate (~28.2% $SiO_2$, ~9.3% $Na_2O$:), ~38.0 g deionized water, ~0.5 g 50% NaOH, and ~8.8 g~25% SDAOH. The mixture was stirred with a magnetic stirrer and then ~4.14 g of ~10 wt. % $Rh(en)_3Cl_3 \cdot 3H_2O$ solution (en=ethylenediamine) solution was added drop wise with stirring and then stirred until homogenous. The mixture was divided between three 23 ml Teflon autoclaves and then ~0.94 g of USY (~60 wt. % $SiO_2$, ~17 wt. % $Al_2O_3$) zeolite was mixed in each liner. The autoclaves were heated for ~7 days at ~140° C. in a tumbling oven at ~25 rpm. The product was recovered by vacuum filtration and washed with de-ionized water. Phase analysis by powder X-ray diffraction showed that the sample was pure chabazite. The sample was finally calcined in air for ~3 hours at ~560° C. at a temperature ramp of ~4.5° C./min. Analysis by X-ray fluorescence showed the sample contained ~1.31 wt. % Rh.

The catalysts described above were tested on a surrogate gasoline type fuel containing ~45 vol % 3-methyl pentane, ~15 vol % n-hexane, ~10 vol % 2,2,4-trimethyl pentane (=iso-octane), ~20 vol % toluene and ~10 vol % ethanol. For the tests, about 50 mg-1250 mg of catalyst were sized to 40-60 mesh and blended with quartz sized to 60-80 mesh to obtain 4 $cm^3$ of catalyst-quartz mixture. The catalyst-quartz mixture was loaded into a stainless steel reactor tube of about 10 cm length and about 0.8 cm inner diameter. The reactor tube was heated by a furnace to maintain a constant temperature of roughly 500° C. in the catalyst throughout the length of the catalyst bed. A thermocouple in the bed was used to confirm that the experiments were performed isothermally. A gas mixture comprising ~1.4 mol % 3-methyl pentane, ~0.46 mol % n-hexane, ~0.25 mol % 2,2,4 trimethyl pentane, ~0.76 mol % toluene, ~0.69 mol % ethanol, ~13.1 mol % $H_2O$, and ~12.6 mol % $CO_2$ in $N_2$ balance was fed at ~2 bara pressure and 500° C. catalyst bed temperature. Reaction products CO, $CO_2$, $H_2$, were analyzed by GC-TCD (gas chromatography—thermal conductivity detector), while $CH_4$, cracked products, and aromatics were analyzed by GC-FID (flame ionization detector). Unless otherwise noted, tests were conducted at a residence time of about 10 g Rh*s/g fuel.

In the Examples below, the conversion of individual fuel components was calculated according to Equation (6):

$$\text{Conversion} = \frac{\left\{[F]_i^{in} - [F]_i^{out} \times \frac{[N_2]^{in}}{[N_2]^{out}}\right\} \times C_{F,i}}{\sum_i [F]_i^{in} \times C_{F,i}} \quad (6)$$

In Equation (6), $[N_2]^{in}$ corresponds to the concentration of $N_2$ at the reactor inlet in mol/liter; $[N_2]^{out}$ corresponds to the concentration of $N_2$ at the reactor outlet in mol/liter; $[F]_i^{in}$ corresponds to the concentration of fuel component "i" at the reactor inlet in mol/liter; $[F]_i^{out}$ corresponds to the concentration of fuel component "i" at the reactor outlet in mol/liter; and $C_{F,i}$ corresponds to the carbon number of fuel component "i".

Carbon product selectivity in the Examples below was defined according to Equations (7) and (8). Single component selectivities can be calculated using Equation (7). Additionally, a combined selectivity for formation of CO plus $CO_2$ ($CO_x$ selectivity) can be calculated using Equation (8).

$$\text{Selectivity} = \frac{[P_i]^{out} \cdot C_{P,i} \cdot \frac{[N_2]^{in}}{[N_2]^{out}}}{\sum_i \left\{[F]_i^{in} - [F]_i^{out} \cdot \frac{[N_2]^{in}}{[N_2]^{out}}\right\} \cdot C_{F,i}} \quad (7)$$

$$CO_x \text{ selectivity} = \frac{\{[CO]^{out} + [CO_2]^{out}\} \cdot \frac{[N_2]^{in}}{[N_2]^{out}} - [CO_2]^{in}}{\sum_i \left\{[F]_i^{in} - [F]_i^{out} \cdot \frac{[N_2]^{in}}{[N_2]^{out}}\right\} \cdot C_{F,i}} \quad (8)$$

In addition to the definitions provided for Equation (6), in Equations (7) and (8), $[CO_2]^{out}$ corresponds to the concentration of $CO_2$ at the reactor outlet in mol/liter; $[CO]^{out}$ corresponds to the concentration of CO at the reactor outlet in mol/liter; $[CO_2]^{in}$ corresponds to the concentration of $CO_2$ at the reactor inlet in mol/liter; and $[P]_i^{out}$ corresponds to the concentration of product "i" at the reactor outlet in mol/liter.

In the results presented herein, conversion and product selectivities were determined as average values between about 10 hours and about 15 hours time on stream. In the following Examples, catalysts were tested in two types of configurations. Most of the tests corresponded to physical mixtures of the catalysts described in an example. For comparison, selected catalyst systems were tested in a stacked configuration with the reforming and methanation catalyst physically mixed in front of a separate downstream dehydrocracking catalyst. The weight ratio of reforming and methanation catalysts was chosen so that the amount of Rh in the reforming catalyst (i.e., Catalyst A) and in any Rh-CHA methanation catalyst (i.e., Catalyst B) was equal in a given catalyst composition.

In FIGS. 1-7 and 9-14, bar graphs are used to show conversion and selectivity values determined in Examples 1-7. In FIGS. 1-7 and 9-14, the left hand set of bar graphs is labeled to show the order that results are presented in. That order is maintained within the figure.

Example 1—Effect of Cracking/Dehydrocracking and Metal Promoter

Example 1 compared a physical mixture containing Catalyst A (reforming) and Catalyst B (methanation), as well as physical mixtures of Catalyst A, Catalyst B, and either Catalyst C, D, or E (cracking/dehydrocracking). The weight ratio of catalysts A:B was 1:2.33, while the weight ratios for the A:B:C, A:B:D, and A:B:E were 1:2.33:2. These weight ratios resulted in having roughly equal amounts of Rh supported on the reforming catalyst and the methanation catalyst.

Figure 2:
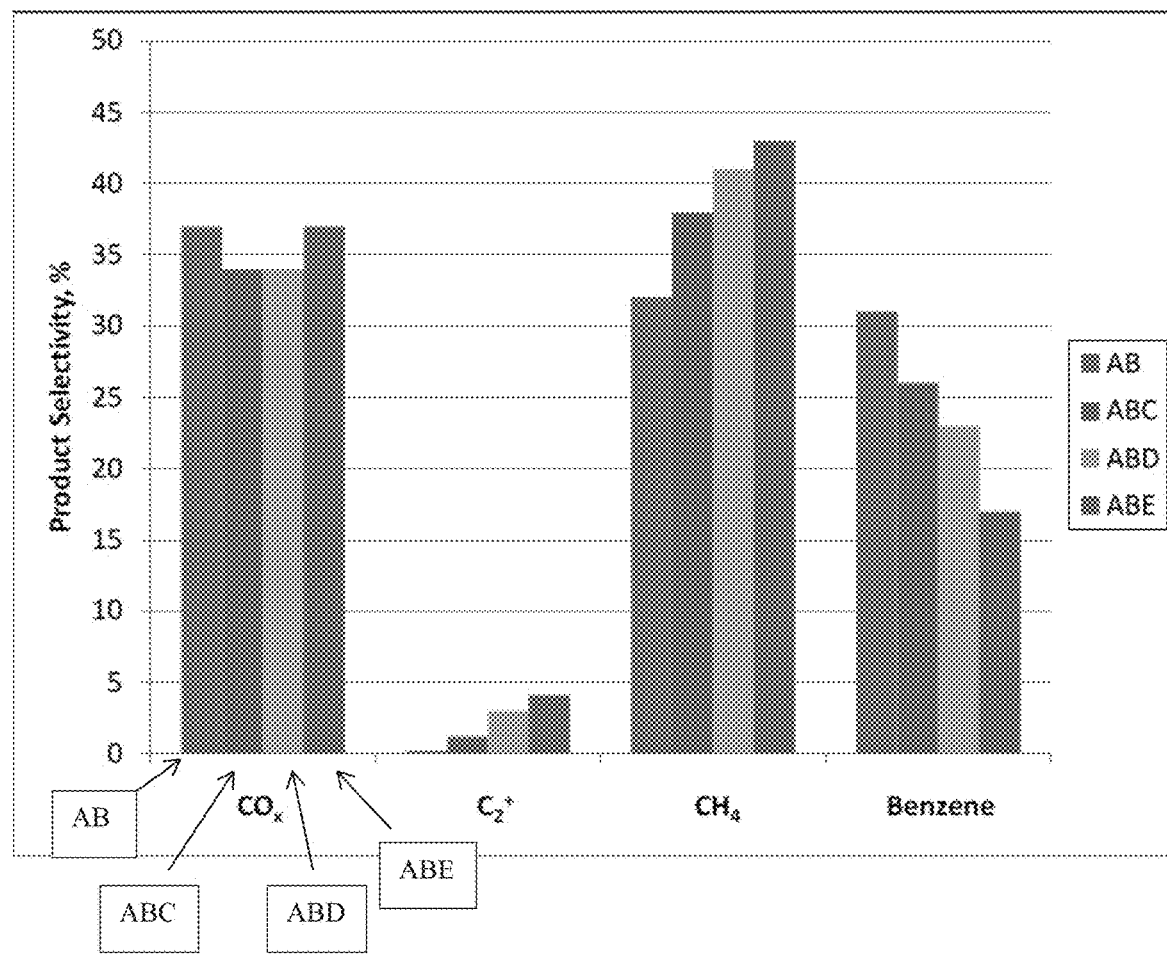
FIG. 2 shows a graph of product distributions for conversion of a model fuel composition in the presence of various catalyst compositions.

FIG. 1 shows the conversion of individual fuel components for the catalysts tested in this example. FIG. 2 shows the selectivity for the resulting conversion products. Catalyst AB achieved the highest conversion of n-hexane and toluene with high product selectivity for methane. However, conversion of branched paraffins (3-methylpentane and isooctane) was low. For catalyst ABC, the addition of H-MCM-68 cracking catalyst resulted in enhanced conversion of the branched paraffins. Addition of either Ga or Zn as a promoter metal to the MCM-68 in catalyst ABD resulted in a further increase in conversion of the branched paraffins. It is noted that catalysts ABC, ABD, and ABE also produced small amounts of $C_{2+}$ cracked products.

For catalyst ABE, the hexane conversion remained above 90%, and the methane selectivity remained favorably high. It is noted that the conversion of toluene was reduced. However, toluene is a relatively high octane component without conversion, so the unexpected increase in ability to convert paraffins more than offsets any loss in conversion of toluene.

The substantial increase in conversion of isoparaffins when using Zn or Ga to promote catalyst activity, and specifically in conversion of 3-methylpentane, was unexpected. The octane value of 3-methylpentane can be between 80 and 85, so the ability to efficiently convert 3-methylpentane to higher octane value methane and syngas can be beneficial. Based on the conventional understanding of Ga and Zn as aromatization catalysts, the ability to substantially enhance isoparaffin conversion was unexpected. It is noted that Zn provides somewhat higher activity for conversion of 3-methylpentane than Ga. Although the remaining data provided herein relates to activity for conversion for Zn-promoted catalysts, it is believed that Ga-promoted catalysts would show similar relative conversion activity trends.

Additionally, the substantial increase in isooctane conversion when using Zn-promoted MCM-68 was unexpected, in part due to the sheer size of the improvement in isooctane conversion. The conversion of isooctane using catalyst ABC (no metal promoter) was below 40%. By contrast, the addition of Zn in catalyst ABE resulted in nearly complete conversion of isooctane. Thus, the ability to perform substantially complete conversion of a heavily branched isoparaffin was unexpected.

Example 2—Comparison of P-ZSM-5 and MCM-68

Example 2 compared a physical mixture containing Catalyst A (reforming) and Catalyst N (methanation), as well as a physical mixtures of Catalyst A, Catalyst N, and Catalyst M (ZSM-5 cracking). The weight ratio of catalysts A:N was 1:2.7, while the weight ratios for A:N:M was 1:2.7:4. These weight ratios resulted in having roughly equal amounts of Rh supported on the reforming catalyst and the methanation catalyst.

Figure 3:
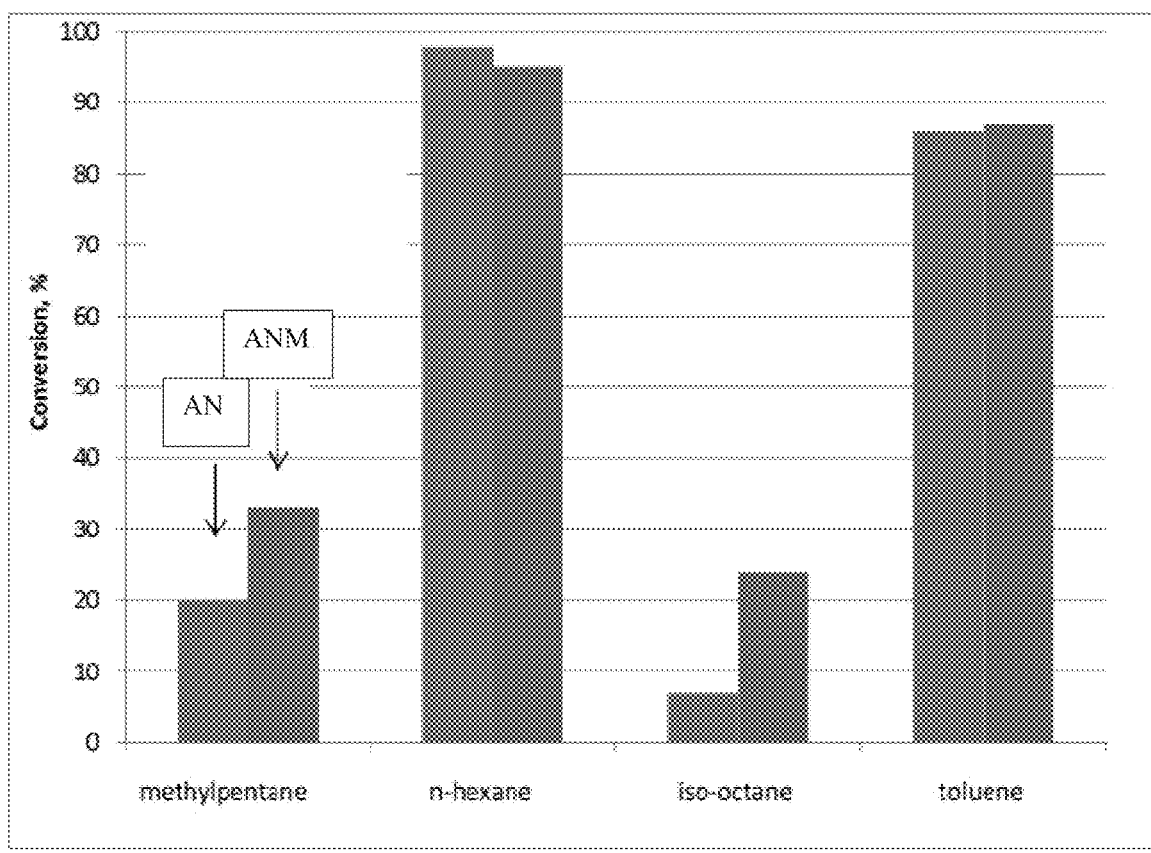
FIG. 3 shows a graph of conversion rates for conversion of a model fuel composition in the presence of various catalyst compositions.

FIG. 3 shows the conversion of individual fuel components for the catalysts tested in this example. Catalyst AN showed comparable conversion activity to catalyst AB from Example 1. Therefore, it was expected that comparison of catalyst ANM (no metal promotion of the P-ZSM-5) would provide a reasonable comparison with catalyst ABC (no metal promotion of MCM-68) from Example 1. As shown in FIG. 3, the addition of P-ZSM-5 (catalyst ANM) resulted in somewhat similar benefits for conversion activity as compared to the benefits from addition of MCM-68 (catalyst ABC in FIG. 1), but there were some differences. For 3-methylpentane, catalyst ANM appeared to provide marginally better improvement of the conversion activity relative to catalyst ABC. For isooctane, catalyst ABC seemed to provide a similar additional marginal improvement in conversion activity relative to catalyst ANM. Based on the two types of isoparaffins studied, P-ZSM-5 and MCM-68 appeared to provide different but comparable benefits for improving isoparaffin conversion.

Example 3—Effect of Zn Metal Promotion with P-ZSM-5

Based on the comparable activity improvements for isoparaffin conversion using either P-ZSM-5 and MCM-68, addition of Zn as a promoter metal on P-ZSM-5 was investigated to determine if a similar unexpected activity benefit could be achieved with either type of cracking catalyst.

Example 3 compared catalyst AB and catalyst ABE from Example 1 with a physical mixture containing Catalyst A (reforming), Catalyst B (methanation), and catalyst J (Zn-P-ZSM-5, cracking/dehydrocracking). The weight ratio of catalysts A:B was 1:2.33, while the weight ratios for A:B:J was 1:2.33:2. These weight ratios resulted in having roughly equal amounts of Rh supported on the reforming catalyst and the methanation catalyst.

Figure 4:
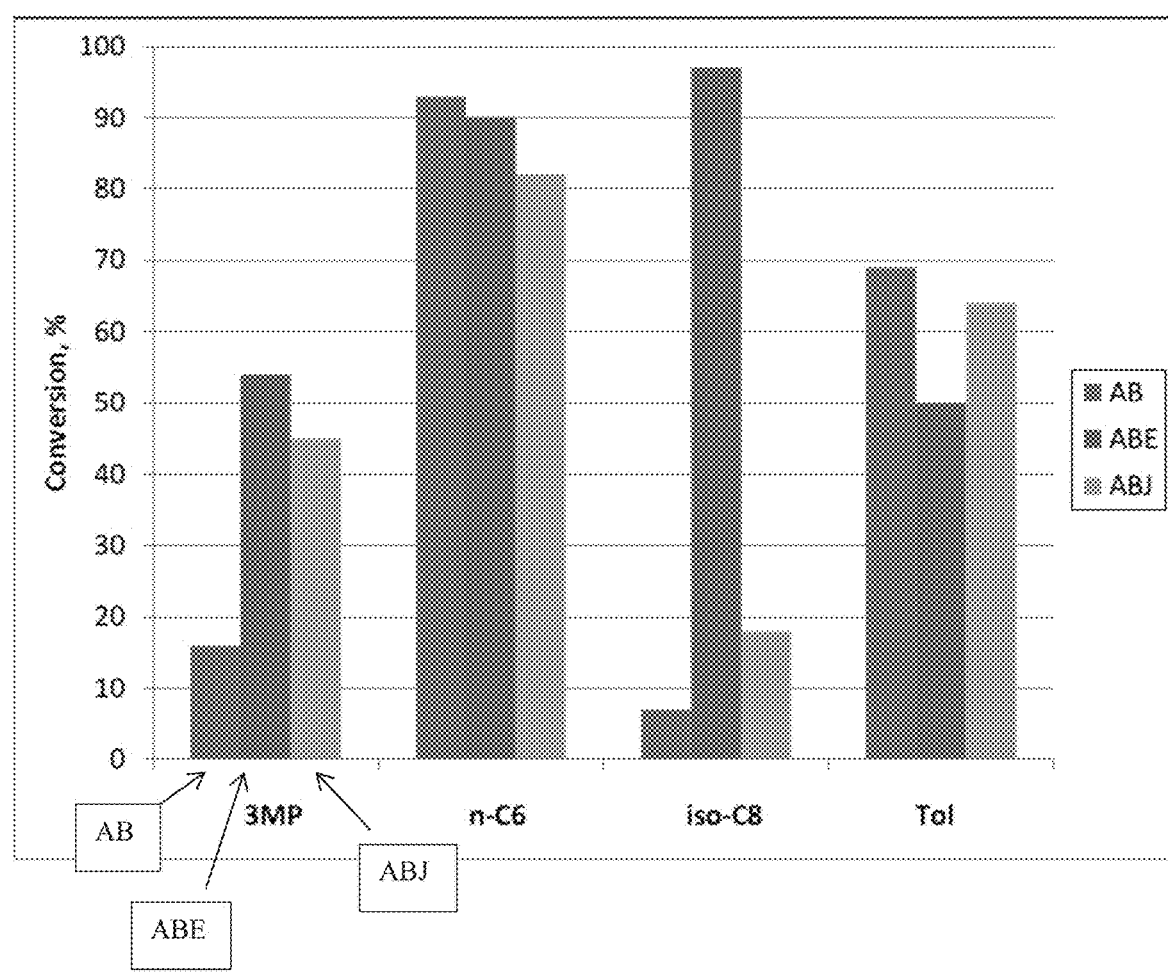
FIG. 4 shows a graph of conversion rates for conversion of a model fuel composition in the presence of various catalyst compositions.
Figure 5:
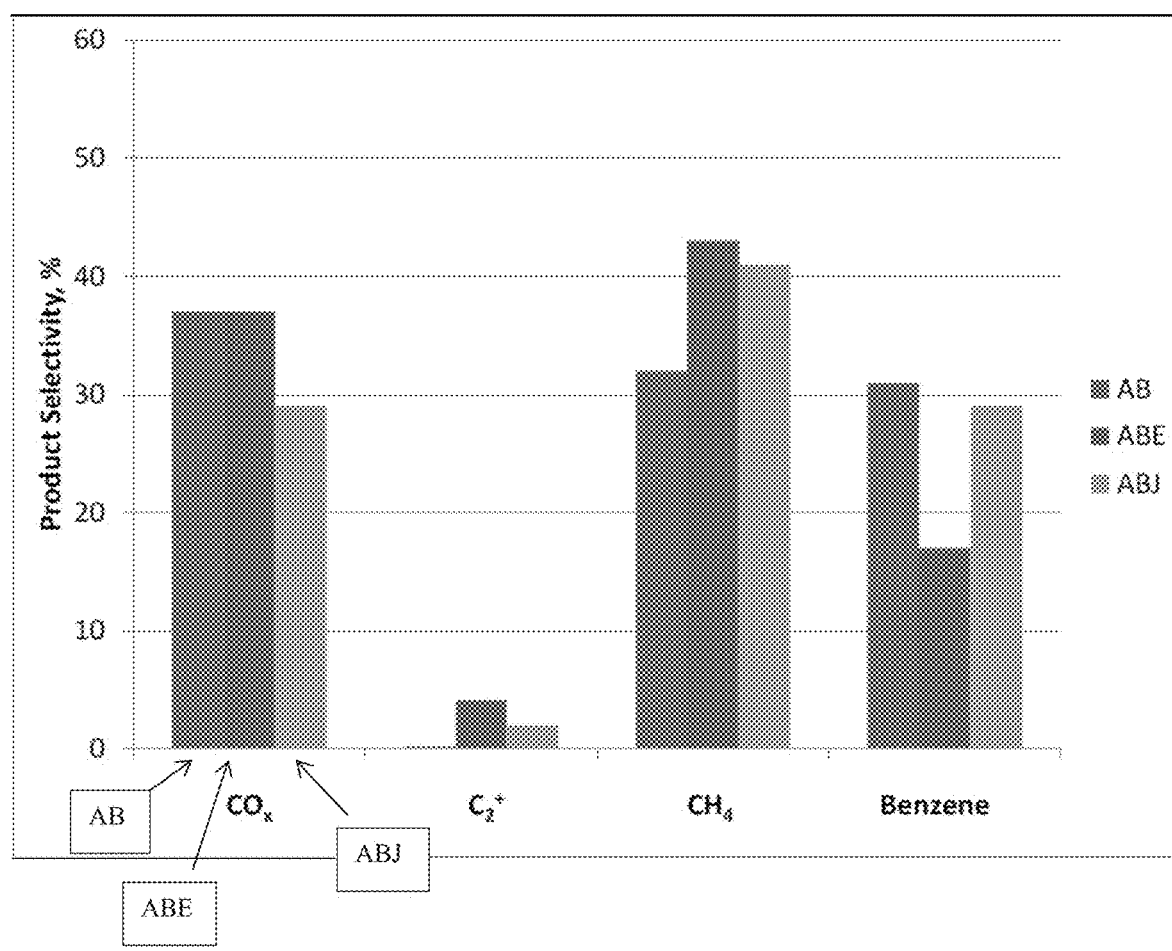
FIG. 5 shows a graph of product distributions for conversion of a model fuel composition in the presence of various catalyst compositions.

FIG. 4 shows the conversion of individual fuel components for the catalysts tested in this example. FIG. 5 shows the selectivity for the resulting conversion products. With regard to 3-methylpentane, catalyst ABJ showed comparable conversion activity to catalyst ABE. Thus, addition of Zn or Ga to either MCM-68 or P-ZSM-5 can provide the unexpected benefit of improving conversion of 3-methylpentane. It is noted that the conversion of isooctane by catalyst ABJ in FIG. 4 was substantially different from the conversion of isooctane using catalyst ABE, indicating that the isooctane conversion using catalyst ABE represents an additional unexpected benefit. However, isooctane has an octane rating of 100 (by definition), so the benefit of being able to convert 3-methylpentane to methane and/or syngas is of greater value than the ability to convert isooctane. With regard to selectivity, as shown in FIG. 5, catalyst ABJ provides comparable selectivity to catalyst ABE for formation of methane.

Example 4—Effect of Zn Loading in Zn-MCM-68

Example 4 compared catalyst ABC and catalyst ABE from Example 1 with physical mixtures of catalysts that included varying amounts of Zn supported on MCM-68. The additional catalysts corresponded to catalysts ABF, ABG, and ABH.

Figure 6:
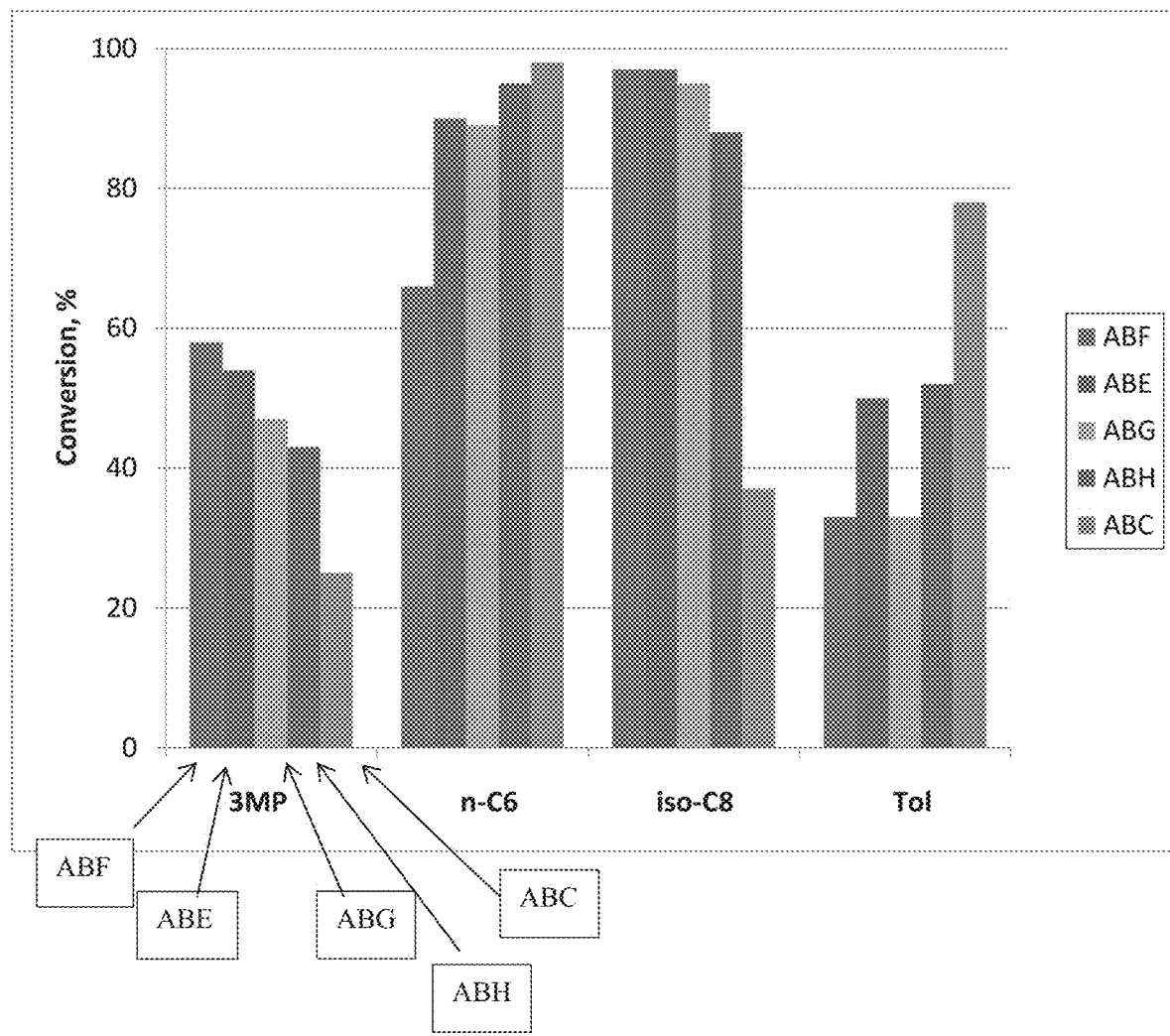
FIG. 6 shows a graph of conversion rates for conversion of a model fuel composition in the presence of various catalyst compositions.
Figure 7:
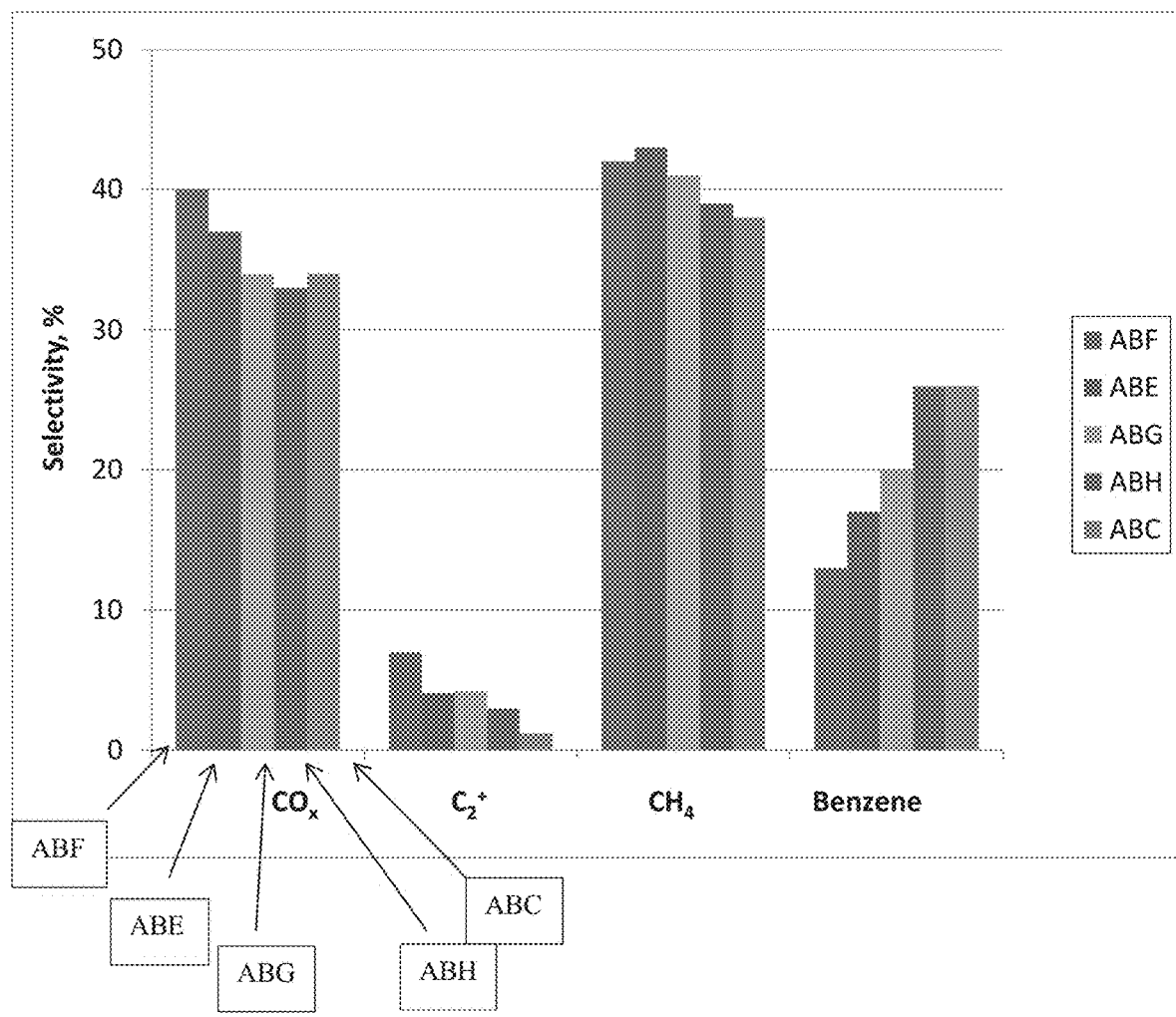
FIG. 7 shows a graph of product distributions for conversion of a model fuel composition in the presence of various catalyst compositions.

FIG. 6 shows the conversion of individual fuel components for the catalysts tested in this example. FIG. 7 shows the selectivity for the resulting conversion products. As shown in FIG. 6, varying the Zn loading on the MCM-68 portion of the catalyst composition from about 0.2 wt % to about 3 wt % of the weight of the MCM-68 portion of the catalyst composition resulted in some variations in the overall activity. For example, increasing the Zn loading from 1.1 wt % on the MCM-68 portion (in catalyst ABE) to 3.0 wt % Zn on the MCM-68 portion (in catalyst ABF) resulted in a reduction in n-hexane conversion from 90+% conversion to between 60% to 70% conversion. This reduction from substantially complete conversion of n-paraffins to only 60% to 70% conversion could make MCM-68 catalyst compositions with greater than 2.5 wt % loadings of Zn less desirable relative to MCM-68 catalyst compositions with 0.9 wt % to 2.5 wt % of Zn. As shown in FIG. 7, catalyst ABF also had a somewhat different product selectivity profile than catalyst ABE. In addition to producing more $CO_x$, catalyst ABF also produced more $C_{2+}$ cracking conversion products than catalyst ABE. The additional production of $C_{2+}$ cracked products could be less desirable due to the potential for increased coke formation on catalyst when such cracked products are present. However, it is noted that catalyst ABF still provides the unexpectedly high conversion of isooctane observed for catalyst ABE.

For catalysts ABG and ABH, lowering the amount of Zn in the MCM-68 portion of the catalyst composition to either 0.7 wt % (catalyst G) or 0.2 wt % (Catalyst H) resulted in reduction in the amount of 3-methylpentane conversion. For the remaining fuel components, catalysts ABG and ABH appeared to have similar conversion activity to catalyst E. Based on the reduction in conversion of single branch isoparaffins, MCM-68 catalyst compositions with less than 0.9 wt % loadings of Zn, or particularly less than 0.5 wt % loadings of Zn, could potentially be less desirable relative to MCM-68 catalyst compositions with 0.9 wt % to 2.5 wt % of Zn. However, it is noted that catalysts ABG and ABH still provided a substantial portion of the unexpectedly high conversion of isooctane observed for catalyst ABE. Additionally, the overall product selectivity profiles for catalysts ABG and ABH is similar to the product selectivities for catalyst ABE.

Figure 8:
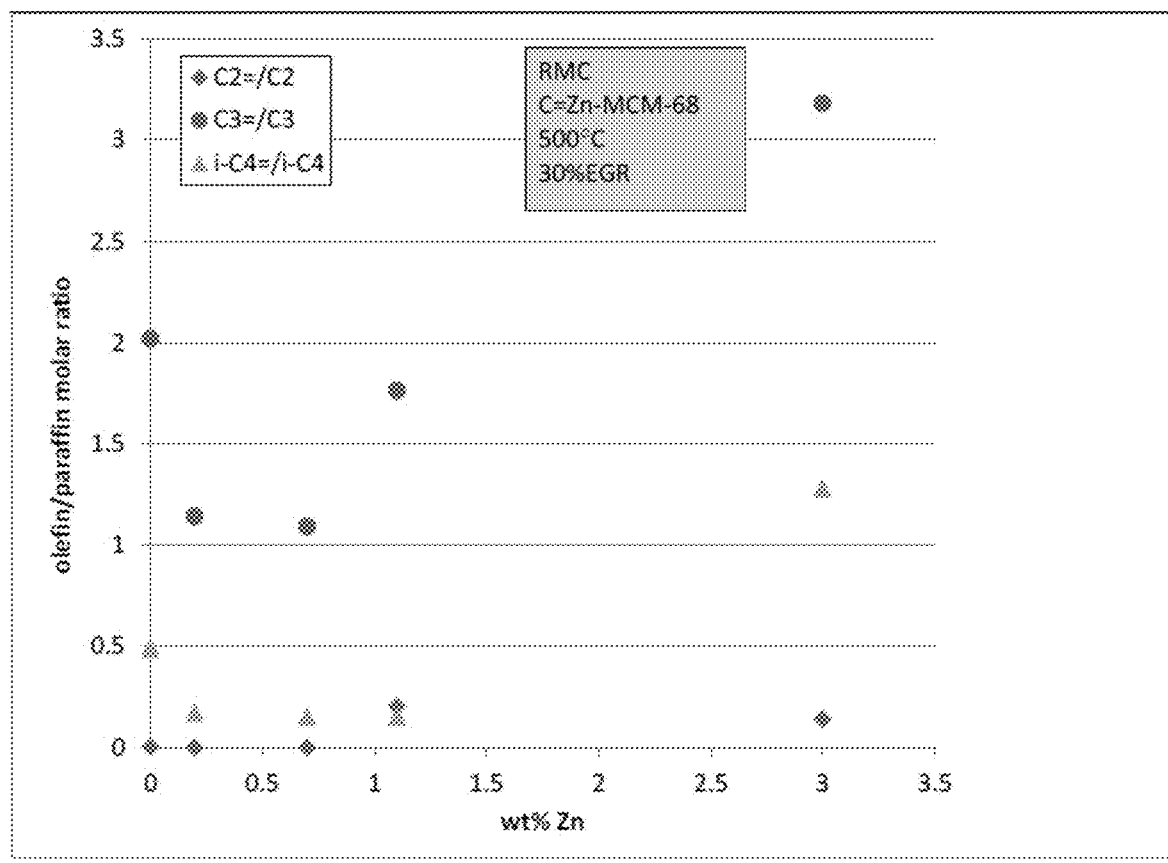
FIG. 8 shows olefin versus paraffin selectivities for $C_2$-$C_4$ compounds generated during conversion of a model fuel composition in the presence of various catalyst compositions.

To further investigate the differences in conversion based on varying Zn loadings on the MCM-68 portion of the catalysts, the olefin to paraffin molar ratio for the $C_2$-$C_4$ products was determined. FIG. 8 shows the olefin to paraffin ratio for each of $C_2$, $C_3$, and $C_4$ products for each of catalysts ABD, ABE, ABF, ABG, and ABH. As shown in FIG. 8, lower Zn loadings appear to provide lower ratios of olefins to paraffins for the $C_3$ and $C_4$ products. The ratio of olefins to paraffins for $C_2$ products appears to be relatively close to zero for all of the Zn loadings in FIG. 8. The high olefin to paraffin ratios at a Zn loading of 3 wt % on the MCM-68 portion of the catalyst (catalyst ABF) could be an indicator of an increased tendency for coke to form in an engine environment.

Example 5—Catalyst Mixture Versus Stacked Catalyst

Example 5 compared two versions of a catalyst including catalyst compositions A, B, and I. In a first version (catalyst ABI), a physical mixture was formed of catalyst A, catalyst B, and catalyst I. In a second version (catalyst AB+I), a stacked bed was formed with a first portion of the catalyst corresponding to a mixture of catalyst A and catalyst B, and a second (downstream) portion of the catalyst corresponding to catalyst I. The weight ratio of catalysts for both versions was 1:2.33:2, to provide roughly equal amounts of Rh supported on both catalyst A and catalyst B.

Figure 9:
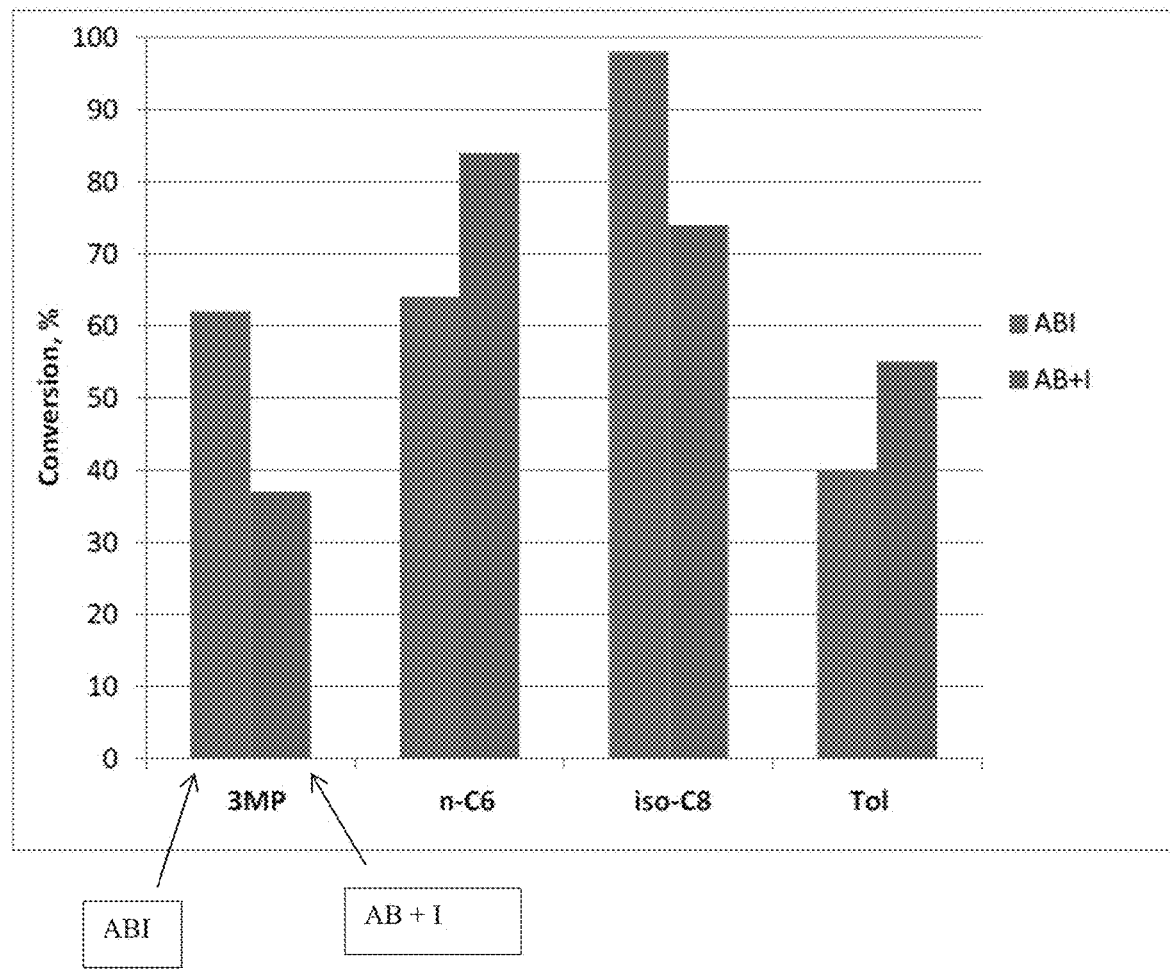
FIG. 9 shows a graph of conversion rates for conversion of a model fuel composition in the presence of various catalyst compositions.
Figure 10:
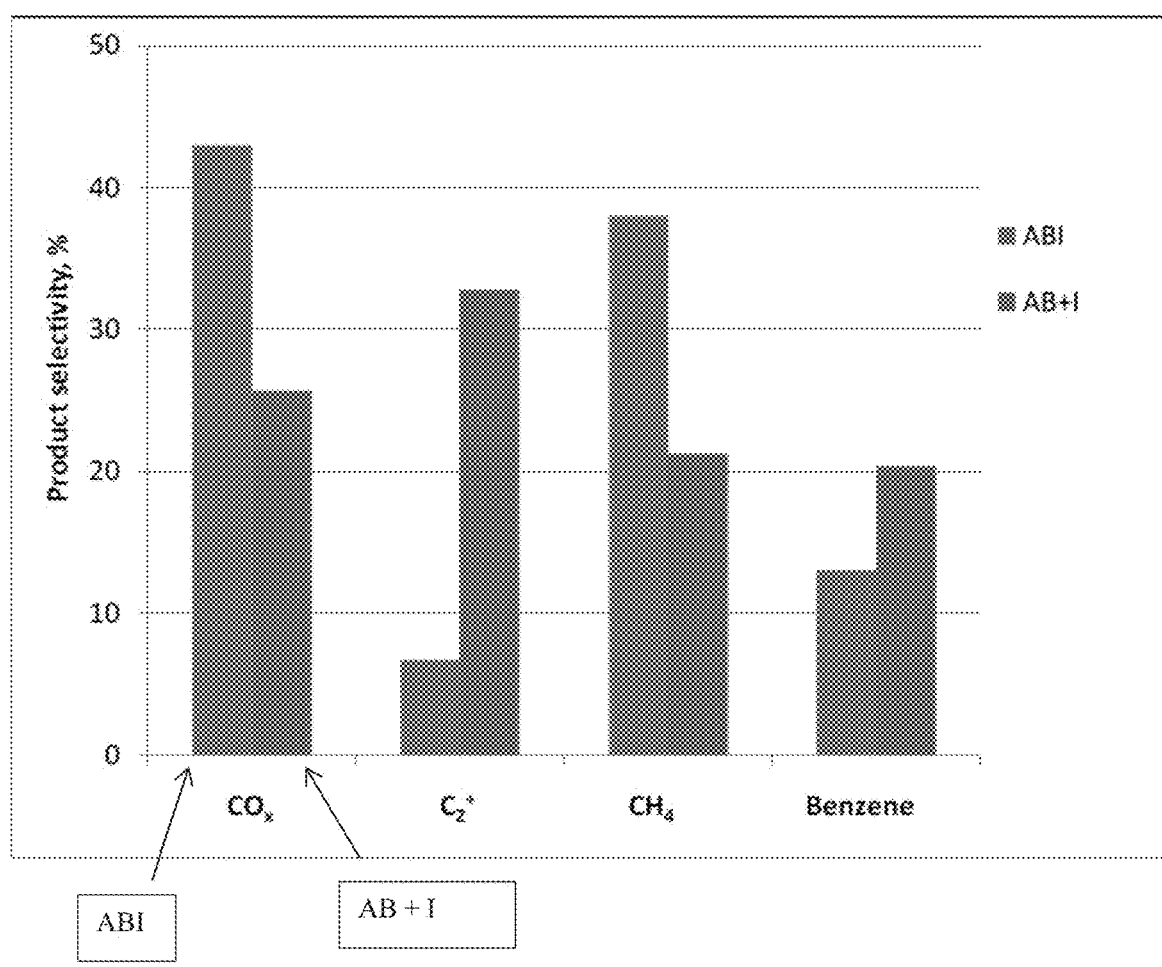
FIG. 10 shows a graph of product distributions for conversion of a model fuel composition in the presence of various catalyst compositions.

FIG. 9 shows the conversion of individual fuel components for the catalysts tested in this example. FIG. 10 shows the selectivity for the resulting conversion products. In FIG. 9, catalyst ABI appears to provide improved conversion of isoparaffins relative to the stacked bed configuration in catalyst AB+I. However, the conversion of n-hexane is somewhat improved in the stacked bed configuration. Depending on the specific type of desired activity, either catalyst ABI or catalyst AB+I could be beneficial based on conversion. The larger differences in activity between catalyst ABI and AB+I are illustrated in FIG. 10, which shows the product selectivities. The stacked bed configuration for catalyst AB+I results in a substantial increase in $C_{2+}$ products and a substantial decrease in methane formation, but also a substantial decrease in $CO_x$ formation. If coking does not present an issue in a particular reaction environment, the decreased production of $CO_x$ could be a beneficial feature of the stacked bed configuration for catalyst AB+I.

Example 6—Effect of Methanation Catalyst

Example 6 compared catalyst ABG from Example 4 with a catalyst including only a reforming catalyst composition (catalyst A) and a dehydrocracking catalyst composition (catalyst G). The weight ratio of catalyst compositions for catalyst ABG was 1:2.33:2, while the weight ratio for catalyst AG was 1:2. Although catalyst AG did not include a methanation catalyst, the total amount of Rh included in catalyst AG was the same as the total amount of Rh in catalyst ABG.

Figure 11:
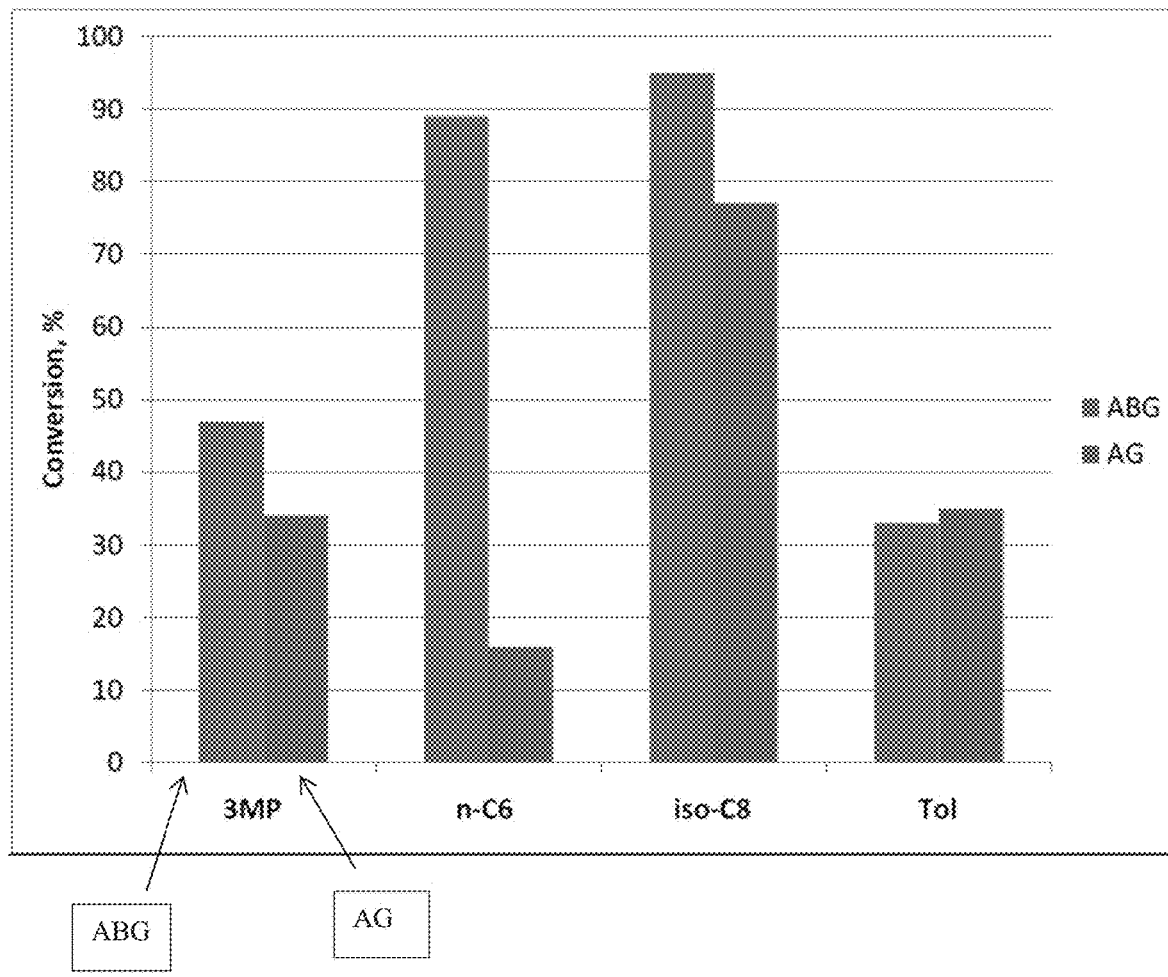
FIG. 11 shows a graph of conversion rates for conversion of a model fuel composition in the presence of various catalyst compositions.
Figure 12:
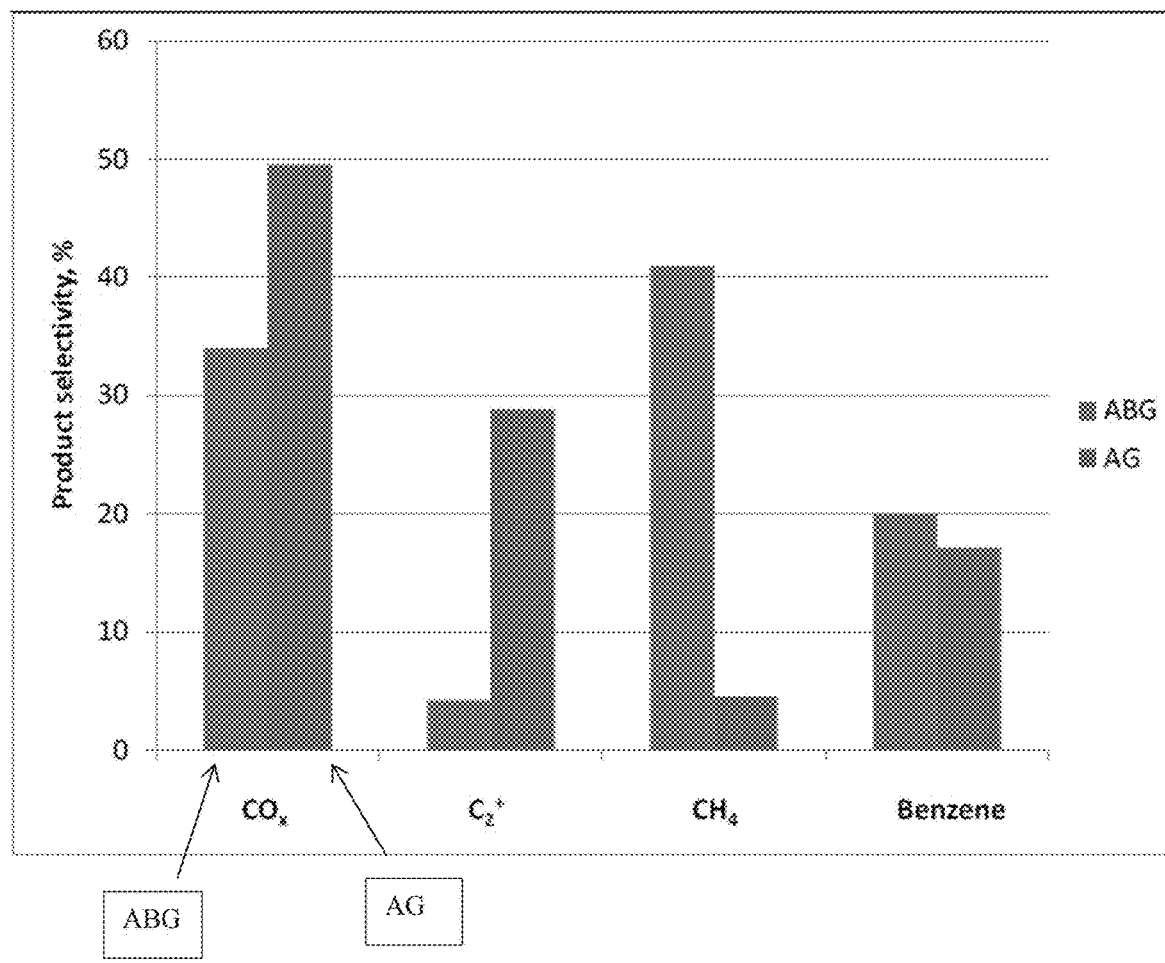
FIG. 12 shows a graph of product distributions for conversion of a model fuel composition in the presence of various catalyst compositions.

FIG. 11 shows the conversion of individual fuel components for the catalysts tested in this example. FIG. 12 shows the selectivity for the resulting conversion products. As would be expected, FIG. 12 shows that catalyst ABG (including methanation catalyst B) resulted in substantially higher product selectivity for formation of methane, as compared to catalyst AG. However, as shown in FIG. 11, inclusion of a methanation catalyst also provided a benefit in conversion of all of the paraffins (including isoparaffins) present in the test fuel composition. This is somewhat surprising, given the small pore size of the chabazite in catalyst B, as it would be expected that the isoparaffins in the test fuel composition would have too large of a molecular diameter to enter the pores of the 8-member rings. The impact of the presence of catalyst B was larger for conversion of n-hexane.

Example 7—Effect of Upstream Reforming Catalyst

Example 7 compared catalyst L with a catalyst corresponding to a stacked bed of a mixture of a reforming catalyst composition (catalyst A) and a methanation catalyst composition (catalyst K) followed by catalyst L. Catalyst L corresponds to P-ZSM-5 with both supported Zn and supported Rh. As a result, catalyst L corresponds to a catalyst with combined activity for reforming and dehydrocracking. The weight ratio of catalyst compositions for catalyst AK+L was 1:10:4.29, so that roughly equal amounts of Rh were supported on the reforming catalyst and the methanation catalyst. It is noted that catalyst L also included Rh, and that the tests involving catalyst AK+L were conducted at a residence time of about 15 g Rh*s/g fuel. The tests involving catalyst L alone were conducted at the residence time of about 10 g Rh*s/g fuel used in the other examples.

Figure 13:
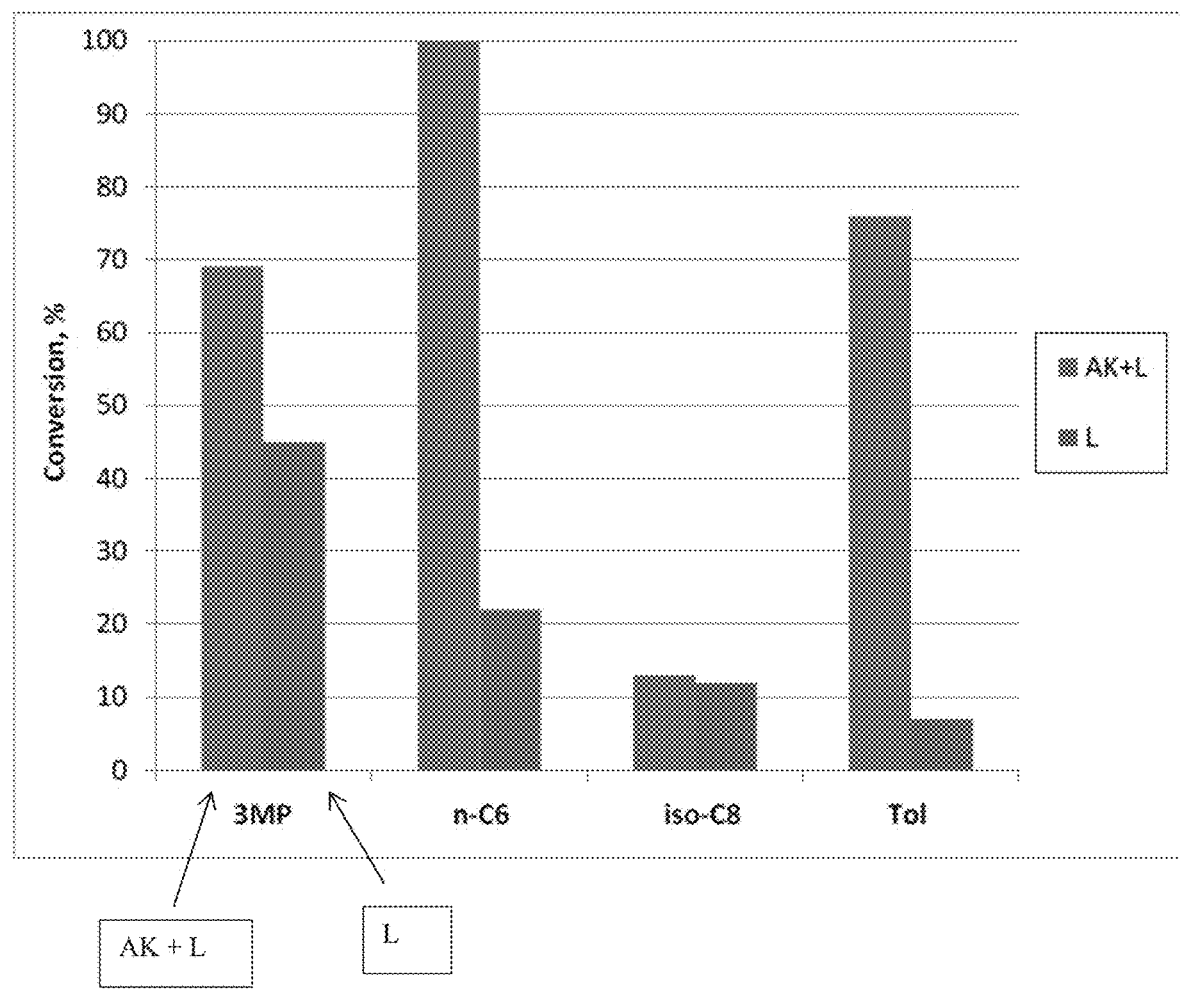
FIG. 13 shows a graph of conversion rates for conversion of a model fuel composition in the presence of various catalyst compositions.
Figure 14:
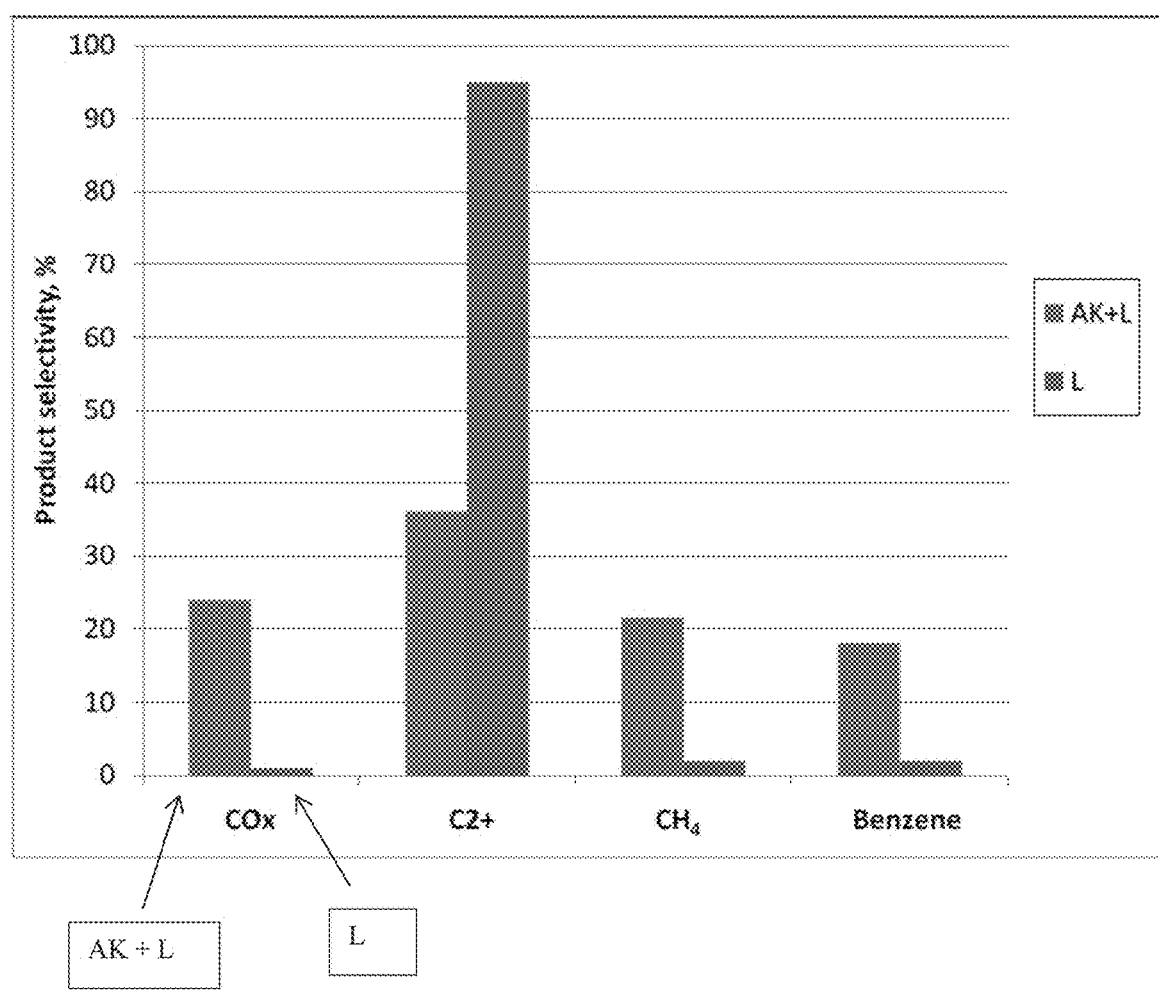
FIG. 14 shows a graph of product distributions for conversion of a model fuel composition in the presence of various catalyst compositions.

FIG. 13 shows the conversion of individual fuel components for the catalysts tested in this example. FIG. 14 shows the selectivity for the resulting conversion products. As shown in FIG. 13, catalyst AK+L had improved activity for conversion of methylpentane, but showed similar conversion of isooctane relative to catalyst L alone. Catalyst AK+L did provide substantial additional activity for conversion of n-hexane and toluene. With regard to product selectivities, catalyst L produced primarily $C_{2+}$ cracked products, including having little or no selectivity for production of CON. The product selectivity for catalyst AK+L was more similar to the product selectivity for the stacked bed catalyst AB+I in Example 5, although catalyst AK+L had substantially higher selectivity for formation of $C_{2+}$ cracked products. It is noted that in a reaction environment where olefin production is desired, catalyst AK+L could be beneficial. It is further noted that the molar ratio of olefins to paraffins in the $C_2$-$C_4$ products for both catalyst AK+L and catalyst L was between 11.5 and 12. This is substantially higher than the molar ratio of olefins to paraffins for catalyst AB+I.

ADDITIONAL EMBODIMENTS

Embodiment 1

A catalytic composition comprising: at least 5 wt % (or at least 10 wt %) relative to a weight of the catalytic composition of a first catalyst comprising a support material and about 0.25 wt % to about 10 wt % Rh relative to the weight of the first catalyst; at least 10 wt % (or at least 20 wt %) relative to a weight of the catalytic composition of a second catalyst comprising a zeolite having a largest ring size of an 8-member ring and about 0.25 wt % to about 10 wt % Rh relative to the weight of the second catalyst; and at least 20 wt % (or at least 30 wt %) relative to a weight of the catalytic composition of a third catalyst comprising a MSE framework type zeolite, an MFI framework type zeolite, or a combination thereof, and further comprising about 0.2 wt % to about 3.0 wt % of Zn, Ga, or a combination thereof relative to a weight of the third catalyst.

Embodiment 2

The catalytic composition of Embodiment 1, wherein the catalytic composition comprises a physical mixture of the first catalyst, the second catalyst, and the third catalyst.

Embodiment 3

The catalytic composition of any of the above embodiments, wherein the MSE framework type zeolite comprises MCM-68, wherein the WI framework type zeolite comprises ZSM-5, or a combination thereof.

Embodiment 4

The catalytic composition of any of the above embodiments, wherein the third catalyst further comprises about 0.1 wt % to about 10 wt % P, or about 0.1 wt % to about 5.0 wt %, or about 0.1 wt % to about 3.0 wt %.

Embodiment 5

The catalytic composition of any of the above embodiments, wherein the third catalyst comprises about 0.2 wt % to about 2.5 wt % Ga, or about 0.7 wt % to about 2.5 wt %, or about 0.7 wt % to about 2.0 wt %; or wherein the third catalyst comprises about 0.2 wt % to about 2.5 wt % Zn, or about 0.2 wt % to about 2.0 wt %, or about 0.2 wt % to about 1.5 wt %; or wherein the third catalyst comprises about 0.2 wt % to about 2.5 wt % combined of Zn and Ga, or about 0.2 wt % to about 2.0 wt %, or about 0.2 wt % to about 1.5 wt %.

Embodiment 6

The catalytic composition of any of the above embodiments, wherein the second catalyst comprises a CHA framework type zeolite.

Embodiment 7

The catalytic composition of any of the above embodiments, wherein a) the first catalyst further comprises about 0.25 wt % to about 10 wt % of an additional metal selected from the group consisting of Co, Ru, Pt, Pd, Ni, Ir, Zn, Re and mixtures thereof, a total weight of Rh and the additional metal being about 20 wt % or less relative to the weight of the first catalyst; b) the second catalyst further comprises about 0.25 wt % to about 10 wt % of an additional metal selected from the group consisting of Co, Ru, Pt, Pd, Ni, Ir, Zn, Re and mixtures thereof, a total weight of Rh and the additional metal being about 20 wt % or less relative to the weight of the second catalyst; c) the third catalyst further comprises about 0.25 wt % to about 10 wt % of an additional metal selected from the group consisting of Co, Ru, Pt, Pd, Ni, Ir, Rh, Re and mixtures thereof, a total weight of the Zn, Ga, or a combination thereof and the additional metal being about 10 wt % or less relative to the weight of the third catalyst; or d) a combination of a) and/or b) and/or c).

Embodiment 8

The catalytic composition of any of the above embodiments, wherein the support material comprises a metal oxide composition selected from aluminum oxides, silicon oxides, rare-earth metal oxides, Group IV metal oxides, and mixtures thereof, the metal oxide composition optionally comprising a mixture of an aluminum-containing oxide and a cerium-containing oxide.

Embodiment 9

The catalytic composition of any of the above embodiments, wherein the support material comprises a zeolite having a largest ring size of a 10-member ring or a 12-member ring; wherein the catalytic composition further comprises one or more additional zeolites, the one or more additional zeolites having a largest ring size of a 10-member ring or a 12-member ring; or a combination thereof.

Embodiment 10

Use of the catalytic composition of any of Embodiments 1-9 for conversion of a hydrocarbon-containing fuel.

Embodiment 11

A reformer for use in an exhaust gas recycle portion of an internal combustion engine powertrain, said reformer comprising a catalytic composition according to any of Embodiments 1-9, the catalytic composition being configured to convert a mixture comprising an internal combustion engine exhaust gas and a first hydrocarbon-containing fuel to a gaseous mixture comprising $H_2$, CO, $CO_2$, $H_2O$, $N_2$, and greater than about 1.0 mol % $CH_4$ based on the total moles of gas in the gaseous mixture.

Embodiment 12

A method of increasing the octane rating of an internal combustion engine exhaust gas stream, said method comprising: providing an exhaust gas-containing mixture to an exhaust gas recycle reformer, the exhaust gas-containing mixture comprising engine exhaust gas and a first hydrocarbon-containing fuel, said engine exhaust gas having an initial octane rating, and converting under reforming conditions at least a portion of the exhaust gas-containing mixture in the presence of a catalytic composition according to any of Embodiments 1-9 to form a reformed gaseous mixture, the reformed gas mixture comprising $H_2$, CO, $CO_2$, $H_2O$, $N_2$, and greater than about 1.0 mol % $CH_4$ based on the total moles of gas in the reformed gaseous mixture.

Embodiment 13

The reformer of Embodiment 11 or the method of Embodiment 12, wherein said converting supplies heat sufficient to maintain the reformer at an average reformer temperature above about 450° C.

Embodiment 14

The reformer of Embodiment 11 or method of Embodiment 12 or 13, wherein the reformed gaseous mixture has an octane rating (RON) from about 100 to about 125; wherein the reformed gaseous mixture comprises from 1.0 mol % to 20 mol % $CH_4$; wherein the reformed gaseous mixture has a $CH_4:H_2$ ratio (mol/mol) of at least about 0.05 to 1.0; or a combination thereof.

Embodiment 15

The reformer of Embodiment 11 or the method of any of Embodiments 12 to 14, wherein a selectivity for methane formation during the converting under reforming conditions is at least 5.0 mol % relative to a total moles of product carbon atoms from converted feed hydrocarbons from the conversion under reforming conditions, or at least 10 mol %, or at least 20 mol %.

As is apparent from the foregoing general description and the specific embodiments, while forms of the invention have been illustrated and described, various modifications can be made without departing from the spirit and scope of the invention. Accordingly, it is not intended that the invention be limited thereby. Many variations will suggest themselves to those skilled in this art in light of the above detailed description. All such variations are within the full intended scope of the appended claims. Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

The invention claimed is:

1. A catalytic composition comprising:
   at least 5 wt % relative to a weight of the catalytic composition of a first catalyst comprising a support material and about 0.25 wt % to about 10 wt % Rh relative to the weight of the first catalyst;
   at least 10 wt % relative to a weight of the catalytic composition of a second catalyst comprising a zeolite having a largest ring size of an 8-member ring and about 0.25 wt % to about 10 wt % Rh relative to the weight of the second catalyst; and
   at least 20 wt % relative to a weight of the catalytic composition of a third catalyst comprising a framework type of MCM-68 zeolite, a framework type of ZSM-5 zeolite, or a combination thereof, and further comprising about 0.2 wt % to about 3.0 wt % of Ga relative to a weight of the third catalyst.

2. The catalytic composition of claim 1, wherein the catalytic composition comprises a physical mixture of the first catalyst, the second catalyst, and the third catalyst.

3. The catalytic composition of claim 1, wherein the framework type of MCM-68 zeolite comprises MCM-68.

4. The catalytic composition of claim 1, wherein the framework type of ZSM-5 zeolite comprises ZSM-5, the third catalyst further comprising about 0.1 wt % to about 5.0 wt % P relative to a weight of the third catalyst.

5. The catalytic composition of claim 1, wherein the third catalyst comprises about 0.7 wt % to about 2.5 wt % Ga.

6. The catalytic composition of claim 1, wherein the catalytic composition further comprises one or more additional zeolites, the one or more additional zeolites having a largest ring size of a 10-member ring or a 12-member ring.

7. The catalytic composition of claim 1, wherein the second catalyst comprises a chabazite framework type zeolite.

8. The catalytic composition of claim 1, wherein the first catalyst further comprises about 0.25 wt % to about 10 wt % of an additional metal selected from the group consisting of Co, Ru, Pt, Pd, Ni, Ir, Zn, Re and mixtures thereof, a total weight of Rh and the additional metal being about 20 wt % or less relative to the weight of the first catalyst.

9. The catalytic composition of claim 1, wherein the second catalyst further comprises about 0.25 wt % to about 10 wt % of an additional metal selected from the group consisting of Co, Ru, Pt, Pd, Ni, Ir, Zn, Re and mixtures thereof, a total weight of Rh and the additional metal being about 20 wt % or less relative to the weight of the second catalyst.

10. The catalytic composition of claim 1, wherein the third catalyst further comprises about 0.25 wt % to about 10 wt % of an additional metal selected from the group consisting of Co, Ru, Pt, Pd, Ni, Ir, Rh, Re and mixtures thereof, a total weight of the Ga and the additional metal being about 10 wt % or less relative to the weight of the third catalyst.

11. The catalytic composition of claim 1, wherein the support material comprises a metal oxide composition selected from aluminum oxides, silicon oxides, rare-earth metal oxides, Group IV metal oxides, and mixtures thereof.

12. The catalytic composition of claim 11, wherein the metal oxide composition comprises a mixture of an aluminum-containing oxide and a cerium-containing oxide.

13. The catalytic composition of claim 1, wherein the support material comprises a zeolite having a largest ring size of a 10-member ring or a 12-member ring.

14. A reformer for use in an exhaust gas recycle portion of an internal combustion engine powertrain, said reformer comprising a catalytic composition configured to convert a mixture comprising an internal combustion engine exhaust gas and a first hydrocarbon-containing fuel to a gaseous mixture comprising $H_2$, CO, $CO_2$, $H_2O$, Na, and greater than about 1.0 mol % $CH_4$ based on the total moles of gas in the gaseous mixture, the catalytic composition comprising:
   at least 5 wt % relative to a weight of the catalytic composition of a first catalyst comprising a support material and about 0.25 wt % to about 10 wt % Rh relative to the weight of the first catalyst;
   at least 10 wt % relative to a weight of the catalytic composition of a second catalyst comprising a zeolite having a largest ring size of an 8-member ring and about 0.25 wt % to about 10 wt % Rh relative to the weight of the second catalyst; and
   at least 20 wt % relative to a weight of the catalytic composition of a third catalyst comprising a framework type of MCM-68 zeolite, a framework type of ZSM-5 zeolite, or a combination thereof, and further comprising about 0.2 wt % to about 3.0 wt % of Ga relative to a weight of the third catalyst.

15. The reformer of claim 14, wherein a selectivity for methane formation during conversion under reforming conditions is at least 5.0 wt % relative to a total moles of product carbon atoms from converted feed hydrocarbons from the conversion under reforming conditions.

16. A method of increasing the octane rating of an internal combustion engine exhaust gas stream, said method comprising:
   (a) providing an exhaust gas-containing mixture to an exhaust gas recycle reformer, the exhaust gas-containing mixture comprising engine exhaust gas and a first hydrocarbon-containing fuel, said engine exhaust gas having an initial octane rating, and
   (b) converting under reforming conditions at least a portion of the exhaust gas-containing mixture in the presence of a catalytic composition to form a reformed gaseous mixture, the reformed gas mixture comprising $H_2$, $CO$, $CO_2$, $H_2O$, $N_2$, and greater than about 1.0 mol % $CH_4$ based on the total moles of gas in the reformed gaseous mixture, the catalytic composition comprising:
      at least 5 wt % relative to a weight of the catalytic composition of a first catalyst comprising a support material and about 0.25 wt % to about 10 wt % Rh relative to the weight of the first catalyst;
      at least 10 wt % relative to a weight of the catalytic composition of a second catalyst comprising a zeolite having a largest ring size of an 8-member ring and about 0.25 wt % to about 10 wt % Rh relative to the weight of the second catalyst; and
      at least 20 wt % relative to a weight of the catalytic composition of a third catalyst comprising a framework type of MCM-68 zeolite, a framework type of ZSM-5 zeolite, or a combination thereof, and further comprising about 0.2 wt % to about 3.0 wt % of Ga relative to a weight of the third catalyst.

17. The method of claim 16, wherein said converting supplies heat sufficient to maintain the reformer at an average reformer temperature above about 450° C.

18. The method of claim 16, wherein the reformed gaseous mixture has an octane rating (RON) from about 100 to about 125.

19. The method of claim 16, wherein the reformed gaseous mixture comprises from 1.0 mol % to 20 mol % $CH_4$, wherein the reformed gaseous mixture has a $CH_4$:$H_2$ ratio (mol/mol) of at least about 0.05 to 1.0, or a combination thereof.

20. The method of claim 16, wherein a selectivity for methane formation during the converting under reforming conditions is at least 5.0 mol % relative to a total moles of product carbon atoms from converted feed hydrocarbons from the conversion under reforming conditions.

* * * * *